(12) United States Patent
Fujishima et al.

(10) Patent No.: US 8,891,417 B2
(45) Date of Patent: Nov. 18, 2014

(54) RADIO COMMUNICATION SYSTEM, BASE STATION APPARATUS, AND RADIO COMMUNICATION METHOD

(75) Inventors: Kenzaburo Fujishima, Kokubunji (JP); Tsuyoshi Tamaki, Machida (JP); Yunjian Jia, Yokohama (JP); Hitoshi Ishida, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 352 days.

(21) Appl. No.: 13/365,647

(22) Filed: Feb. 3, 2012

(65) Prior Publication Data

US 2012/0243513 A1 Sep. 27, 2012

(30) Foreign Application Priority Data

Mar. 24, 2011 (JP) .................... 2011-066063

(51) Int. Cl.
*H04B 1/44* (2006.01)
*H04W 72/08* (2009.01)
*H04H 20/67* (2008.01)

(52) U.S. Cl.
CPC .................... *H04W 72/085* (2013.01)
USPC .......................................... 370/282; 370/339

(58) Field of Classification Search
None
See application file for complete search history.

(56) References Cited

U.S. PATENT DOCUMENTS

| 2007/0281746 | A1* | 12/2007 | Takano et al. | 455/562.1 |
| 2012/0122404 | A1 | 5/2012 | Tanabe | |
| 2012/0275531 | A1* | 11/2012 | Wu et al. | 375/267 |
| 2013/0010744 | A1* | 1/2013 | Kang et al. | 370/329 |

FOREIGN PATENT DOCUMENTS

| JP | 08-186857 A | 7/1996 |
| JP | 11-261474 A | 9/1999 |
| JP | 2010-010968 A | 1/2010 |
| WO | 2011027635 A1 | 3/2011 |

OTHER PUBLICATIONS

3GPP, Evolved Universal Terrestrial Radio Access (E-UTRA); Physical layer procedures:, TS36.213, v9.01, Dec. 2009.
3GPP, Evolved Universal Terrestrial Radio Access (E-UTRA); Radio resource control (RRC); Protocol specification; TS36.331, v9.1.0, Dec. 2009.
Japanese Office Action received in Japanese Application No. 2011-066063 dated Sep. 24, 2013.

* cited by examiner

*Primary Examiner* — Eunsook Choi
(74) *Attorney, Agent, or Firm* — Mattingly & Malur, PC

(57) ABSTRACT

To secure a constant level or more of radio communication quality for each user equipment performing radio communication with a base station apparatus, and to increase the number of user equipment which the base station apparatus can accommodate under a condition of assuring the radio communication quality. In a radio communication system where there exist a base station apparatus having multiple antennas and user equipment for performing radio communication with a first antenna group including one or more of the antennas, the first antenna group is made configurable for each user equipment individually, and addition/deletion of the antenna to/from the first antenna group is performed based on the communication quality of each user equipment so that the number of antennas within the first antenna group may be minimized within a range satisfying a required value of the communication quality between the base station apparatus ad the user equipment.

14 Claims, 19 Drawing Sheets

| USER EQUIPMENT ID (2001) | THE NUMBER OF SPATIAL LAYERS (2002) | TRANSMISSION SCHEME (2003) | ANTENNA IDs FOR 1ST GROUP (2004) | ANTENNA IDs FOR 2ND GROUP (2005) |
|---|---|---|---|---|
| 0 | 2 | SDM | 0,1,2,3 | 4,5 |
| 1 | 2 | SDM | 2,3,4 | 1,5 |
| 2 | 1 | DIV | 4,5 | 3,6 |
| 3 | 1 | DIV | 5 | 4,6 |
| 4 | 2 | SDM | 6,7,8 | 5,9 |
| 5 | 2 | DIV | 3,4,5,6,7,8,9 | 1,2 |

FIG. 13A

| PARAMETER | VALUE |
|---|---|
| THE NUMBER OF SPATIAL LAYERS | 1~4 |
| TRANSMISSION SCHEME | SDM or Diversity |

FIG. 13B

| PARAMETER | VALUE |
|---|---|
| THE NUMBER OF ANTENNAS | 8 |
| ANTENNA ID & DOWNLINK RECEPTION POWER | ID=0,90dBm |
| : | : |
| ANTENNA ID & DOWNLINK RECEPTION POWER | ID=7,140dBm |

(THE NUMBER OF ANTENNAS)

FIG. 13C

| PARAMETER | VALUE |
|---|---|
| UPLINK TRANSMISSION POWER | 20dBm |

FIG. 13D

| PARAMETER | VALUE |
|---|---|
| CATEGORY OF COMMUNICATION QUALITY | THROUGHPUT |
| COMMUNICATION QUALITY | 1.2[Mbit/s] |

FIG. 16

| USER EQUIPMENT ID | THE NUMBER OF SPATIAL LAYERS | TRANSMISSION SCHEME | ANTENNA IDs FOR 1ST GROUP | ANTENNA IDs FOR 2ND GROUP |
|---|---|---|---|---|
| 0 | 2 | SDM | 0,1,2,3 | 4,5 |
| 1 | 2 | SDM | 2,3,4 | 1,5 |
| 2 | 1 | DIV | 4,5 | 3,6 |
| 3 | 1 | DIV | 5 | 4,6 |
| 4 | 2 | SDM | 6,7,8 | 5,9 |
| 5 | 2 | DIV | 3,4,5,6,7,8,9 | 1,2 |

2001 — USER EQUIPMENT ID
2002 — THE NUMBER OF SPATIAL LAYERS
2003 — TRANSMISSION SCHEME
2004 — ANTENNA IDs FOR 1ST GROUP
2005 — ANTENNA IDs FOR 2ND GROUP

FIG. 17

| USER EQUIPMENT ID | COMMUNICATION QUALITY [Mbit/s] | PROPAGATION LOSS FOR EACH ANTENNA ID [dB] | | | | | | | |
|---|---|---|---|---|---|---|---|---|---|
| | | ID=0 | ID=1 | ID=2 | ID=3 | ID=4 | ID=5 | ID=6 | ID=7 |
| 0 | 1.3 | 80 | 88 | 90 | 92 | 98 | 102 | 120 | 130 |
| 1 | 1.4 | 110 | 96 | 92 | 76 | 86 | 100 | 114 | 128 |
| 2 | 1.5 | 140 | 122 | 106 | 92 | 74 | 82 | 96 | 108 |
| 3 | 1.8 | 150 | 138 | 126 | 110 | 90 | 60 | 86 | 116 |
| 4 | 1.6 | 160 | 152 | 144 | 124 | 104 | 96 | 84 | 90 |
| 5 | 1.2 | 146 | 130 | 108 | 94 | 92 | 90 | 100 | 102 |

# RADIO COMMUNICATION SYSTEM, BASE STATION APPARATUS, AND RADIO COMMUNICATION METHOD

CLAIM OF PRIORITY

The present application claims priority from Japanese patent application JP 2011-066063 filed on Mar. 24, 2011, the content of which is hereby incorporated by reference into this application.

FIELD OF THE INVENTION

The present invention relates to a radio communication system, a base station apparatus, and a radio communication method, and more specifically, to a radio communication system which assures radio communication quality, a base station apparatus, and a radio communication method.

BACKGROUND OF THE INVENTION

As a background art of this technology field, there is LTE (Long Term Evolution) which is a cellular system to which OFDMA (Orthogonal Frequency Division Multiple Access)-MIMO (Multiple Input Multiple Output) technology is applied. For example, 3GPP, "Evolved Universal Terrestrial Radio Access (E-UTRA); Physical layer procedures," TS36.213, v9.0.1, 2009/12 discloses a communication procedure in a radio physical layer between a base station apparatus and user equipment; 3GPP, "Evolved Universal Terrestrial Radio Access (E-UTRA); Radio Resource Control (RRC); Protocol specification," TS36.331, v9.1.0, 2009/12 discloses a signaling method between a base station apparatus and user equipment. By performing MIMO transmission between the base station apparatus and the user equipment and allocating respective resource blocks each of which bundles subcarriers of the OFDM to separate user equipment, it is possible for LTE to attain a high throughput by a synergistic effect of space division multiplexing and wide-band OFDMA. However, since the so-called cell-edge terminal which is located at a position away from the base station apparatus uses the same frequency with multiple base station apparatuses, its throughput lowers because the cells formed by the respective base station apparatuses interfere mutually and because the radio transmission attenuation due to an increased distance from the base station apparatus becomes large.

There is macro diversity as one of methods of improving the communication quality of the cell-edge terminal. This aims at communication quality improvement at the cell edge by transmitting data between multiple base station apparatuses and a single piece of the user equipment and is disclosed, for example, by Japanese Unexamined Patent Application Publication No. H8 (1996)-186857. This patent document discloses a method where, by the user equipment receiving predetermined signals transmitted with predetermined powers from multiple base station apparatuses, respectively, and synthesizing these signals, the communication quality after the synthesis in a radio circuit between the respective base station apparatuses which are connected simultaneously is estimated, and a connection control with the base station apparatuses is performed based on the estimated result. That is, it is a technology whereby the communication quality is compared between a case where signals from multiple base station apparatuses are synthesized and a case where it is not synthesized, and if the communication quality improvement by synthesizing is expected to a certain amount or more, a connection control to the base stations is performed.

There is a distributed antenna system as one of other methods of improving the communication quality of the cell-edge terminal. For example, as is disclosed by Japanese Unexamined Patent Application Publication No. H11 (1999)-261474, a system configuration method where the antennas are arranged in a distribution manner and a centralized control apparatus performs a signal processing is known. In this patent application, there is disclosed a distributed antenna system characterized by having selection means for selecting at least one of multiple antenna parts, and beam formation means for forming a transmitted beam or a received beam by setting an arbitrary excitation condition to the antenna part selected by this selection means. That is, this is a technology of preventing interfering radiation to a third party resulting from the use of an unnecessary antenna and increase in interference signal which should be eliminated at the reception side when forming a beam to the user equipment.

In order to improve the communication quality, it is necessary to improve at least SINR (Signal to Interference plus Noise Ratio). However, if multiple signal supply sources are allocated to a single terminal like macro diversity, it will lose other communication opportunities by that amount, and, as a result, the throughput will fall. Therefore, it is possible to improve the throughput of the terminal by allocating separate signal supply sources to the terminals and making the plurality terminals simultaneously communicate as a system, even if suppressing the degree of improvement of SINR. As a technology which pays attention to a fact that the terminal throughput is in a trade-off relationship between the number of terminals and SINR, Japanese Unexamined Patent Application Publication No. 2010-010968 is known, for example. The present application discloses a radio communication method which is an antenna group switching method whereby a current antenna group used for radio communication among multiple antenna groups including a part of or all of multiple antennas provided in the base station is dynamically switched, characterized in that the number of accommodated users which is the number of the communication terminals currently under communication is monitored, the number of accommodated users is compared with the number of accommodatable users which is the largest number of communication terminals such that a value representing the communication quality of the antenna within the current antenna group can be maintained to have a predetermined threshold, and the antenna group having the smallest number of accommodatable users which exceeds the number of accommodated users is decided to be a current antenna group. That is, it is a terminal count adaptive control technology which provides a radio communication service to the terminals with a fewer number of antennas as the number of accommodated terminals becomes larger, and which provides the radio communication service with a higher SINR using a large number of antennas as the number of accommodated terminals becomes smaller.

SUMMARY OF THE INVENTION

The number and combination of antennas of a base station apparatus which govern communication quality for each user equipment will be different depending on positions of the user equipment and shadowing. Moreover, if the antennas of the base station apparatus whose number exceeds the lower limit necessary are allocated to user equipment in order to secure a constant level of communication quality to the user equipment, the number of antennas of the base station apparatus which can be provided to an other user equipment will decrease; therefore, the number of pieces of user equipment which can assure the constant level or more will decrease.

The technology of Japanese Unexamined Patent Application Publication No. H8 (1996)-186857 adds the base station when an improvement quantity of a certain amount or more is generally expected compared to a case of communicating with a single base station, and does not assure the communication quality. The technology of Japanese Unexamined Patent Application Publication No. 2010-010968 controls all pieces of user equipment simultaneously, and does not pay attention on the communication quality of each individual terminal.

In consideration the above points, the present invention has objects to assure radio communication quality equal to or more than the constant level to the each user equipment performing radio communication with the base station apparatus, and to increase the number of pieces of user equipment which the base station apparatus can accommodate under a condition of assuring the radio communication quality.

In the radio communication system in which there are a base station apparatus having multiple antennas and user equipment for performing radio communication with a first antenna group comprised of one or more of the antennas, the problem is solved by the radio communication method that is characterized in that the first antenna group is made configurable for each of the user equipment individually, and addition or deletion of the antenna to/from the first antenna group of the terminal is performed based on communication quality of the each user equipment so that the number of antennas within the first antenna group may be minimized within a range which satisfies a required value of the communication quality between the base station apparatus and the user equipment.

The present invention is characterized in that the antenna continues to be added until the communication quality reaches a certificated quality level, and if the communication quality has a margin to the certificated quality level, the antenna will be released, and that the addition and release of the antenna is performed for each terminal.

According to one solution of the present invention, there is provided a radio communication system that is characterized by having: user equipment; and a base station apparatus equipped with a controller which selects one or more antennas which should be within an antenna group based on the quality of communication performed between the base station apparatus and the user equipment through one or more antennas among the antennas and the number of antennas within the antenna group, and communicates with the user equipment through the first antenna group comprised of the selected antennas. Moreover, in the above-mentioned radio communication system, there is provided a radio communication system in which the first antenna group is configured for each user equipment, the antenna is added or deleted to/from the first antenna group being set up for the user equipment so that the communication quality between the base station apparatus and the user equipment may satisfy a lower limit of the required value of the communication quality and the number of antennas within the first antenna may be minimized, or the communication quality may fall within a range defined by the lower limit of the required value and an upper limit of the required value of the communication quality, and the base station apparatus communicates with the user equipment using at least the antennas of the first antenna group.

According to another solution of the present invention, there is provided a base station apparatus which has multiple antennas for performing radio communication with user equipment, and an antenna group controller which makes up a first antenna group with one or more of the antennas, and adds or deletes the antenna to/from the first antenna group being set up for the user equipment so that the communication quality between the base station apparatus and the user equipment may satisfy the lower limit of the required value of the communication quality and the number of antennas within the first antenna group may be minimized or the communication quality may fall within a range which is defined by the lower limit of the required value and the upper limit of the required value of the communication quality, in which the base station apparatus communicates with the user equipment using at least the antennas of the first antenna group.

According to further another solution of the present invention, there is provided a radio communication method using a base station apparatus which has multiple antennas and performs radio communication with the user equipment through the first antenna group comprised of one or more antennas of the antennas, having the steps of: configuring the first antenna group for each user equipment; and adding or deleting the antenna to/from the first antenna group being set up for the user equipment so that the communication quality between the base station apparatus and the user equipment may satisfy the lower limit of the required value of the communication quality and the number of antennas within the first antenna group may be minimized or the communication quality may fall within a range which is defined by the lower limit of the required value and the upper limit of the required value of the communication quality; in which the base station apparatus communicates with the user equipment using at least the antennas of the first antenna group.

According to the present invention, it is possible to assure the radio communication quality equal to or more than the constant level for each user equipment performing radio communication with the base station apparatus and to increase the number of pieces of user equipment which the base station apparatus can accommodate under a condition of assuring the radio communication quality.

BRIEF DESCRIPTION OF THE DRAWINGS

FIGS. 13A, 13B, 13C, and 13D are examples of a control message transmitted between the base station apparatus and the user equipment according to this embodiment, in which FIG. 13A shows an example of a notification of transmission/reception scheme, FIG. 13B shows an example of information of downlink reception power, FIG. 13C shows an example of information of uplink transmission power, and FIG. 13D shows an example of information of downlink communication quality;

FIG. 16 is a configuration example of an antenna group table according to this embodiment;

FIG. 17 is a configuration example of a communication quality table according to this embodiment;

DETAILED DESCRIPTION OF THE PREFERRED EMBODIMENTS

1. First Embodiment

In this embodiment, an embodiment of the present invention which uses a distributed antenna system where a single base station apparatus 1 has multiple antennas will be described.

Figure 1:
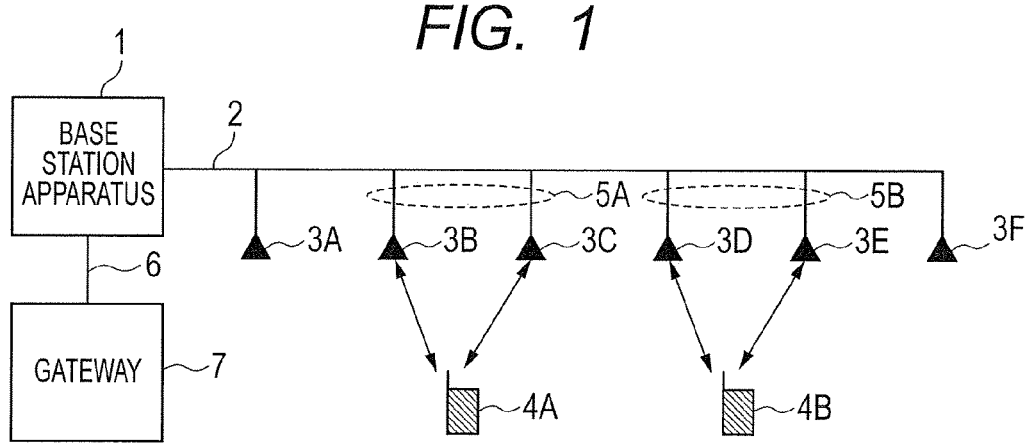
FIG. 1 is a system configuration example in the case of using a base station apparatus having a distributed antenna system.

FIG. 1 shows a system configuration example in the case of using the base station apparatus 1 having the distributed antenna system. The base station apparatus 1 has a function of receiving an input of a data signal to be transmitted to each terminal and outputting a radio signal by multiplexing it with a control signal generated in the inside of the base station apparatus 1, and a function of receiving an input of the radio signal from each terminal, separating the control signal and the data signal, and outputting the data signal. The data signal is transmitted between the base station apparatus 1 and a gateway 7 through a backhaul network 6. The gateway 7 is a data packet terminating device seen from a radio access network, and is connected with another packet transmission network.

A configuration of radio-side apparatuses when seeing from the base station apparatus 1 will be explained. The base station apparatus 1 is connected to multiple antennas 3A to 3F through antenna cable 2. The antenna cable 2 is realizable with copper wire or optical fiber. By equipping the base station apparatus 1 and the antenna 3 with extra radio transceivers, the antenna cable 2 can be substituted with radio transmission, that is, as an alternative of wired transmission. Moreover, by equipping the antenna 3 side with an up-converter, the baseband analog signal can be transmitted on the antenna cable. By further equipping the antenna 3 side with an analog-digital converter and a digital-analog converter, a baseband digital signal can be transmitted. All of these alternative means fall under a category of this embodiment. Incidentally, although transmitting a digital signal requires a wider transmission band on the antenna cable 2, it has an advantage of enabling long distance transmission.

In a section shown by the antenna cable 2, it is necessary to prepare a transmission channel for a downlink signal transmitted from the base station apparatus 1 and a transmission channel for an uplink signal received by the base station apparatus 1 between the base station apparatus 1 and the antenna 3. That is, transmission channels twice as much as the number of the antennas 3 become necessary. The simplest method of reserving the transmission channels is to install antenna cables 2 twice as much as the number of antennas 3 from the base station apparatus 1 independently. In order to reduce the number of installed antenna cables 2, there is also a method of reserving multiple transmission channels in a single antenna cable 2 by several methods, such as time division multiplexing, frequency division multiplexing, and wavelength division multiplexing. When adopting these methods, functions of multiplexing and demultiplexing of a transmission channel are needed separately for both of the base station apparatus 1 and the antenna 3. In this embodiment, these functions will be explained in an example where the antenna cables twice as much as the number of antennas 3 are installed from the base station apparatus 1 independently.

The radio signal is transmitted between the base station apparatus 1 and user equipment 4A and 4B (hereinafter, there is a case where they are called simply as user equipment 4) first antenna groups 5A, 5B which transmit and receive the radio signal to/from the respective user equipment 4A and 4B are defined as in the figure, as one example. The first antenna group 5A is an antenna set used for the radio communication with the user equipment 4A; the first antenna group 5B is an antenna set used for the radio communication with the user equipment 4B. How to decide the first antenna group to the each user equipment 4 will be described layer in a place of explanation of FIG. 7.

Figure 2:
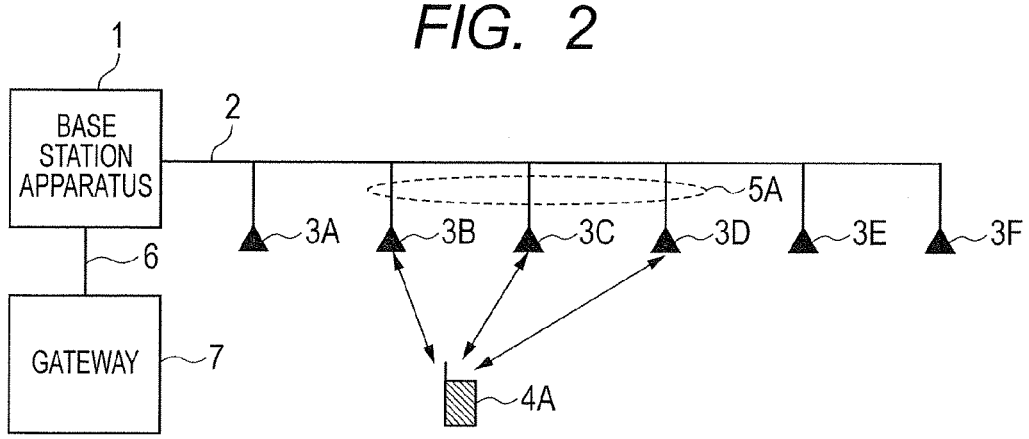
FIG. 2 is a state example in the case where an antenna for user equipment is added according to this embodiment.

FIG. 2 shows a state when an antenna is added to the user equipment 4 according to this embodiment. As compared with the state of FIG. 1, an antenna 3D is added to the first antenna group 5A with respect to the user equipment 4A. In this embodiment, if it is determined that the required value (a lower limit of the required value) of the communication quality cannot be satisfied with the first antenna group 5A shown in FIG. 1 with respect to the user equipment 4A, the base station apparatus 1 will change it to the first antenna group 5A shown in FIG. 2, and tries to improve the communication quality. On the contrary, if the communication quality of the user equipment 4A exceeds an upper limit of the required value which is a value higher than the lower limit of the required value of the communication quality in the state of FIG. 2, the base station apparatus 1 restores the first antenna group 5A to the state of FIG. 1. That is, an operation of deleting the antenna 3D from the first antenna group 5A is performed. A procedure of adding and deleting the antenna to/from the first antenna group and a method of determining which antenna should be added to the first antenna group or should be deleted from the first antenna group will be described later in a place of an explanation of FIG. 7. Incidentally, the lower limit of the required value of the communication quality and the upper limit of the required value thereof can be defined in advance.

Figure 3:
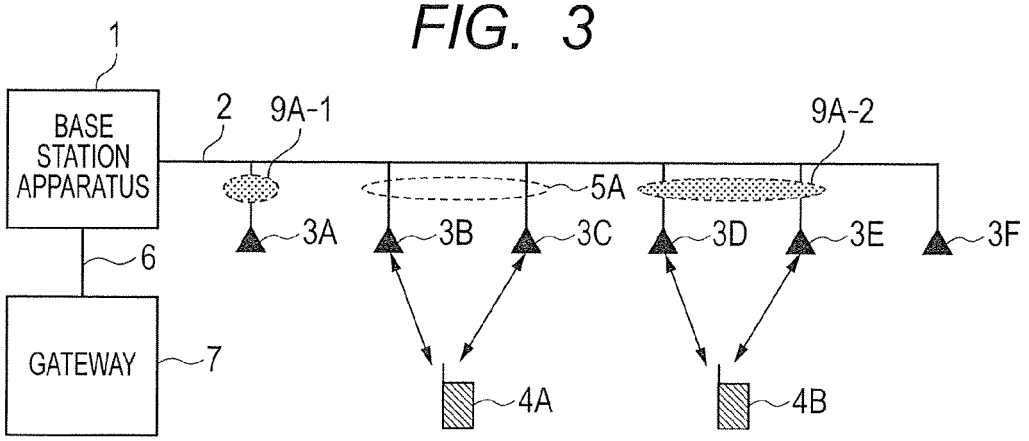
FIG. 3 is a state example in the case where a second antenna group is added to the user equipment according to this embodiment.

FIG. 3 shows a state when a second antenna group is added to the user equipment 4 according to this embodiment. Although only the first antenna group 5A and a second antenna group 9A to the user equipment 4A were described in this diagram, the situation can be defined similarly to the user equipment 4B. The second antenna group 9A is defined as all of or a part of the remaining antennas 3 (3A, 3D 3E, 3F) which excludes the first antenna group 5A. This diagram shows an example where the antennas 3A, 3D, and 3E are defined as of the second antenna group 9A. These antennas are an antenna group which can provide a high communication quality next to the antennas 3B, 3C within the first antenna group 5A with respect to the user equipment 4A. However, the antenna group within the second antenna group 9A is not necessarily required in order for the user equipment 4A to satisfy the required value of the communication quality. Therefore, at a time and a frequency where an other user equipment 4, for example, the user equipment 4B uses the antennas 3D, 3E as the first antenna group, the user equipment 4A cannot use these antennas 3D, 3E. The antenna 3A may be used by the user equipment 4A subserviently when the other user equipment 4 not illustrated does not use it as of the first antenna group.

Moreover, regarding the antennas 3D, 3E, these antennas may be used for the user equipment 4A subserviently when the user equipment 4B which assigns these antennas as the first antenna group uses a time and a frequency different from those of the user equipment 4A.

Thus, the second antenna group includes all of or a part of an antenna group of all the antennas which excludes the first antenna group. When the base station apparatus 1 allocates certain time and frequency to the user equipment 4A and performs communication actually, the first antenna group of the user equipment 4A is sure to be used. In addition, a part of or all of the antennas within the second antenna group can be used subserviently to the first antenna group within a range of the antennas which an other user equipment 4B does not use as the first antenna group in the time and frequency. A method of deciding the second antenna group and a method of allocating the antennas within the second antenna group to the user equipment 4 will be described later in an explanation of FIG. 7.

Figure 4:
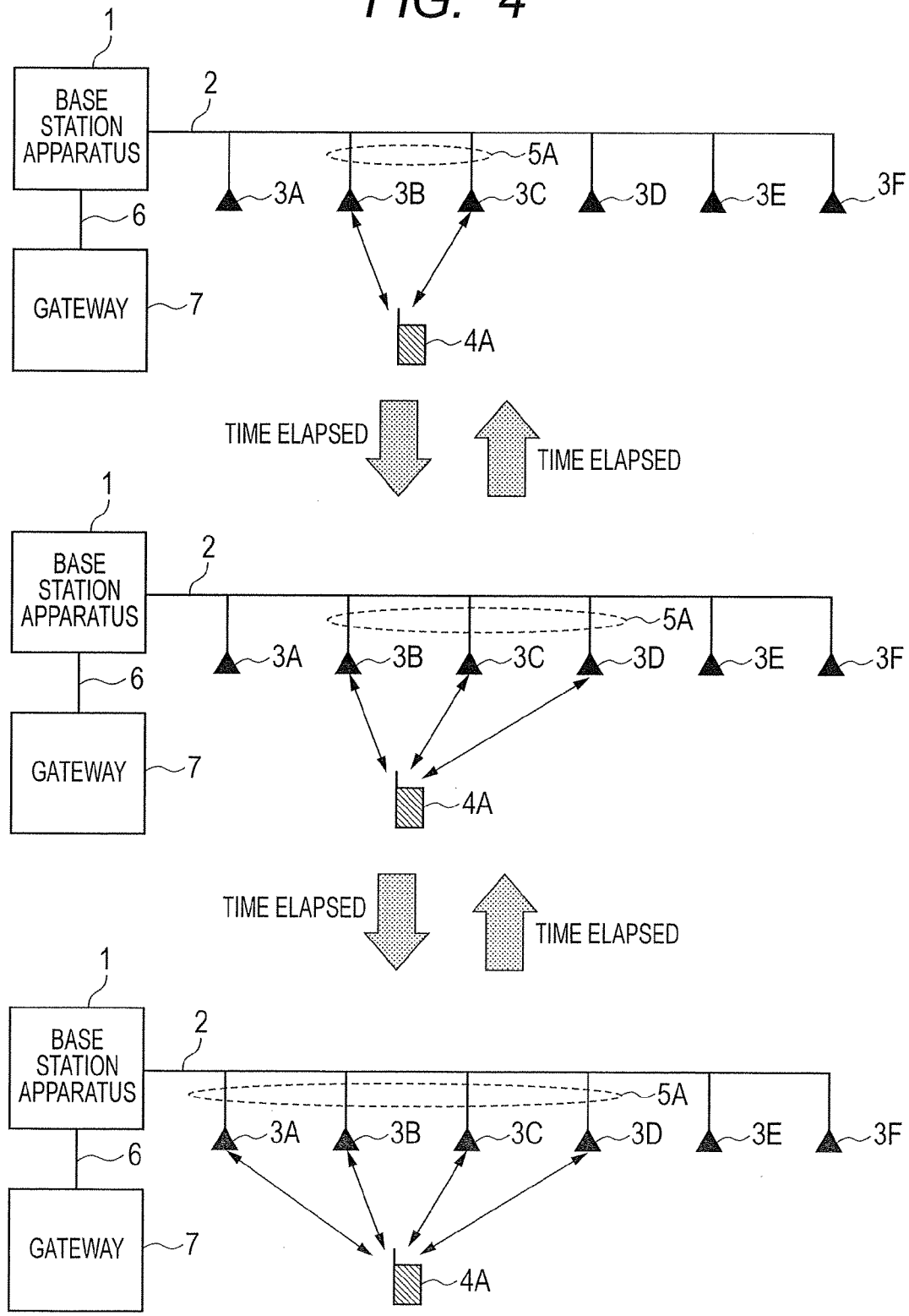
FIG. 4 is an operation example of addition and deletion of an antenna to/from the user equipment according to this embodiment.

FIG. 4 shows an operation example of addition and deletion of the antenna to/from the user equipment 4. In the operation of addition of the antenna to the first antenna group 5A, a state shifts from the top to the bottom; in the operation of the deletion of the antenna from the first antenna group 5A, a state shifts from the bottom to the top. In the example of FIG. 4, the addition or deletion of totally two antennas to/from the user equipment 4A is performed finally. Although it is also possible to add or delete two antennas at once, there is a fear in this case that the control might oscillate, that is, the addition and deletion of the antenna might repeatedly occur as compared with a case where only one antenna is added or deleted because the communication quality to the terminal varies abruptly. For this reason, an embodiment where a single antenna is added or deleted one by one, not performing addition or deletion of multiple antennas at once, will be explained. Although the time interval at which the antenna is added or deleted one by one is arbitrary, a time interval which after the communication quality was measured in a state with only one antenna added or deleted, allows to determine whether addition or deletion of another one antenna should be performed again needs to be secured.

Figure 5:
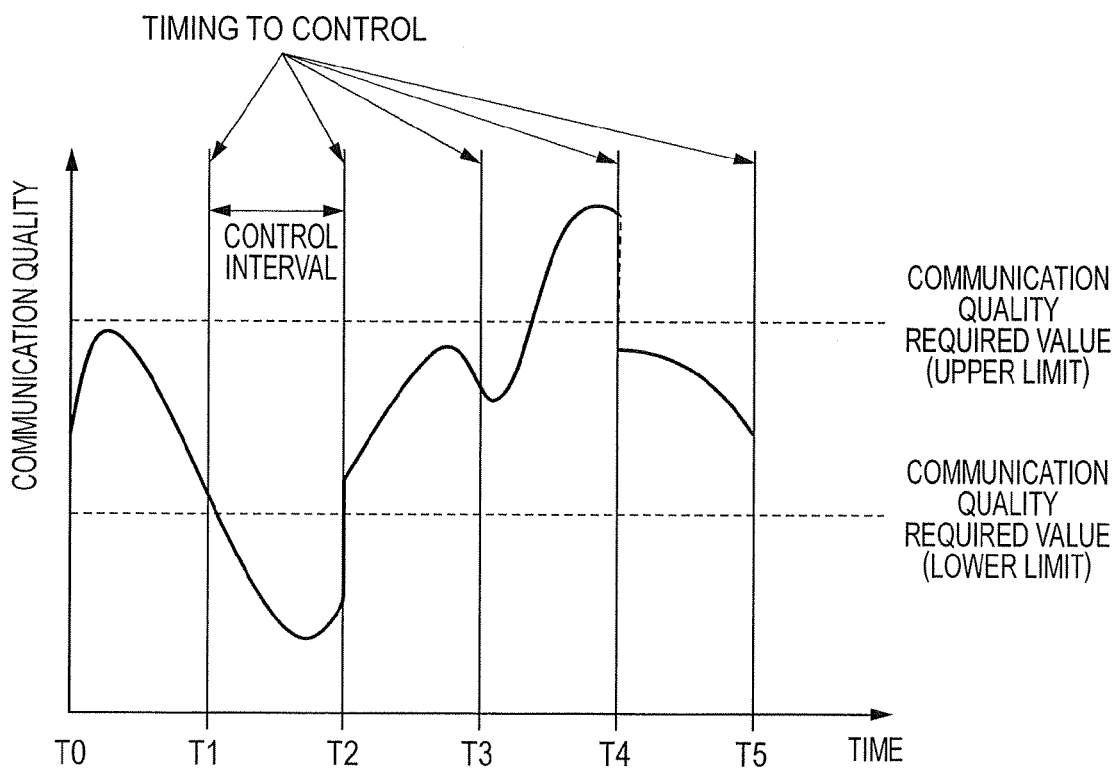
FIG. 5 is a relationship example between a timing to control at which addition or deletion of the antenna is done and a temporal variation of a communication quality according to this embodiment.

FIG. 5 is a diagram showing a relationship between a timing at which the addition or deletion of the antenna is performed according to this embodiment and communication quality variation of the terminal. A vertical axis represents the communication quality of one certain user equipment 4, and a horizontal axis represents time. The communication quality shall be indexes for quantitatively indicating the communication quality, for example, the throughput, SINR (Signal to Interference plus Noise Ratio), a total reception power with the first antenna group on the base station apparatus 1 side of a desired signal related to the terminal, a total reception power of signals transmitted from the first antenna group at the user equipment 4, or the like.

Two thresholds are set with respect to the communication quality on the vertical axis. They are the lower limit of the required value of the communication quality which the terminal should satisfy with the first antenna group at worst, and the upper limit of the required value of the communication quality which is a value higher than the lower limit. For example, the upper limit of the required value of the communication quality is a threshold for releasing the antenna having been allocated excessively in order to allocate it to another terminal. When the communication quality of the terminal goes lower than the lower limit of the required value, an operation of adding the antenna to the first antenna group is performed; similarly, when it exceeds the upper limit of the required value, an operation of deleting the antenna from the first antenna group is performed. Incidentally, other than deleting the antenna because of the communication quality exceeding the upper limit of the required value, it may be done so that the communication quality between the base station apparatus 1 and the user equipment 4 may satisfy the lower limit of the required value of the communication quality, and the number of antennas within the first antenna group being set up for the user equipment 4 may be minimized.

To a time on the horizontal axis, a timing to control at which antenna addition or deletion is performed at regular intervals is provided. Moreover, an interval (control interval) between the timings to control is designated as a section during which it is determined whether the communication quality measurement should be performed and whether the antenna addition or deletion based on this communication quality should be performed. Incidentally, the control interval can be defined in advance.

Let it be assumed that the user equipment 4 with the communication quality shown in FIG. 5 designates two antennas as of the first antenna group at a time point of time T0. The communication quality varies between times T0 and T1. The variation takes place by the following reasons: variation of radio propagation path response by phasing; expansion of the communication quality by utilization of the second antenna group; mutual interference between the user equipment caused by another terminal communicating at the same time and frequency; and the like. However, during a time from time T0 to T1, since variation exists between the lower limit of the required value of the communication quality and the upper limit of the required value thereof, neither antenna addition nor deletion to/from the first antenna group is performed at time T1 which is the timing to control. This situation is the same during a time from time T2 to T3 and during a time from time T4 to T5.

During a time from time T1 to T2, the communication quality falls below the lower limit of the required value. For this reason, at a timing to control T2, the antenna addition is performed to the first antenna group of the user equipment 4. On the contrary, since the communication quality exceeds the upper limit of the required value during a period from time T3 to T4, the deletion of the antenna from the first antenna group of the user equipment 4 is performed at a timing to control T4.

Figure 6:
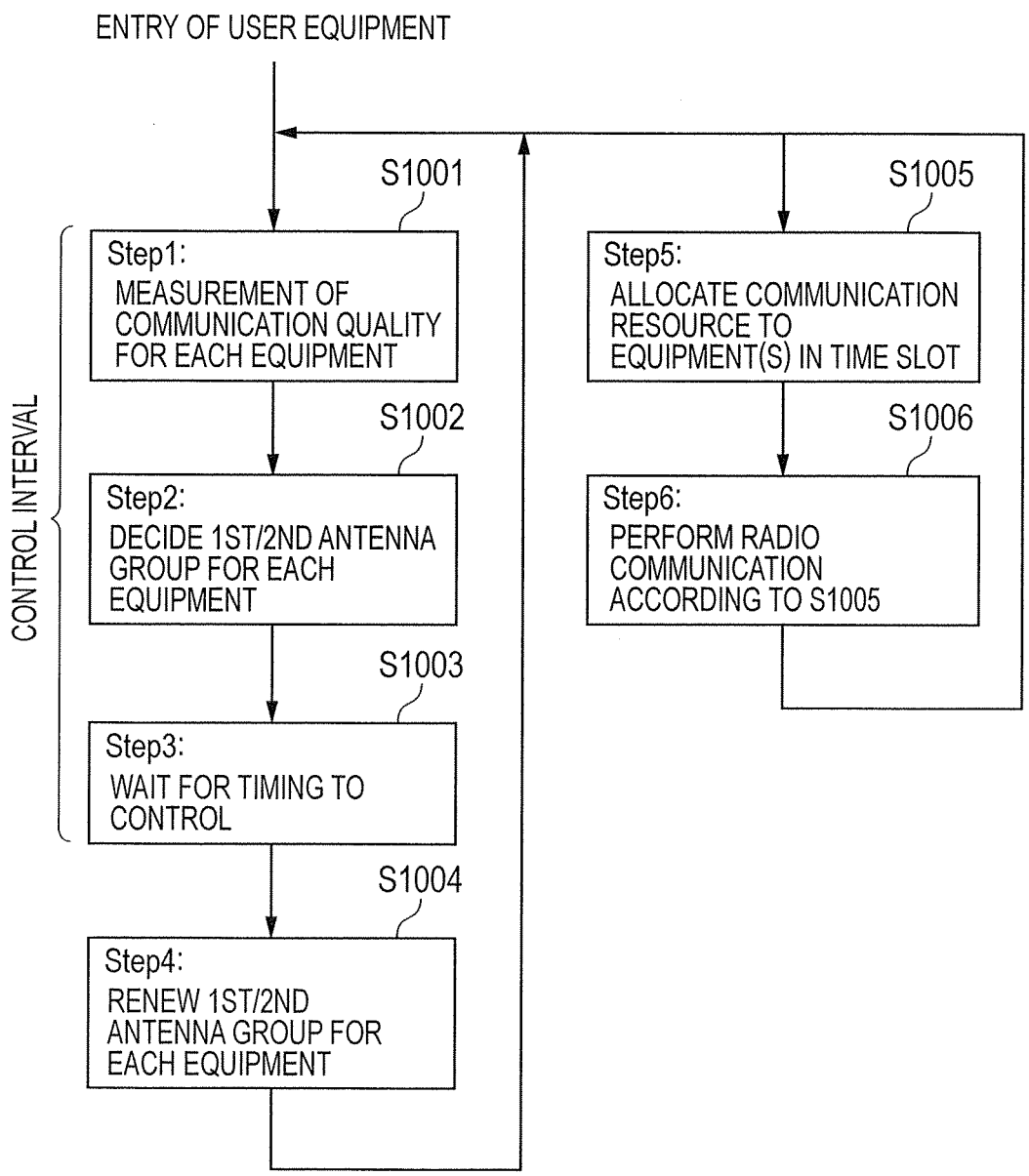
FIG. 6 is a flowchart for realizing a radio communication method according to this embodiment.

FIG. 6 shows an entire flowchart for realizing a radio communication method according to this embodiment. The illustrated flowchart is divided into two parts, a right-hand part and a left-hand part. The left-hand part is a flow of performing maintenance of the first antenna group and the second antenna group; the right-hand part is a flow of controlling data communication between the base station apparatus 1 and the user equipment 4 in each time slot in a state where the first antenna group and the second antenna group are decided. Although flows of both right- and left-hand sides are performed (in parallel) in a steady state, at a time point when the user equipment 4 enters the radio communication system according to this embodiment, only the left-hand side flow operates with regard to the user equipment 4. Incidentally, although configurations of the apparatuses and a configuration of the table will be described later referring to FIG. 14 to FIG. 20, their operations will be explained referring to these figures appropriately.

Figure 7:
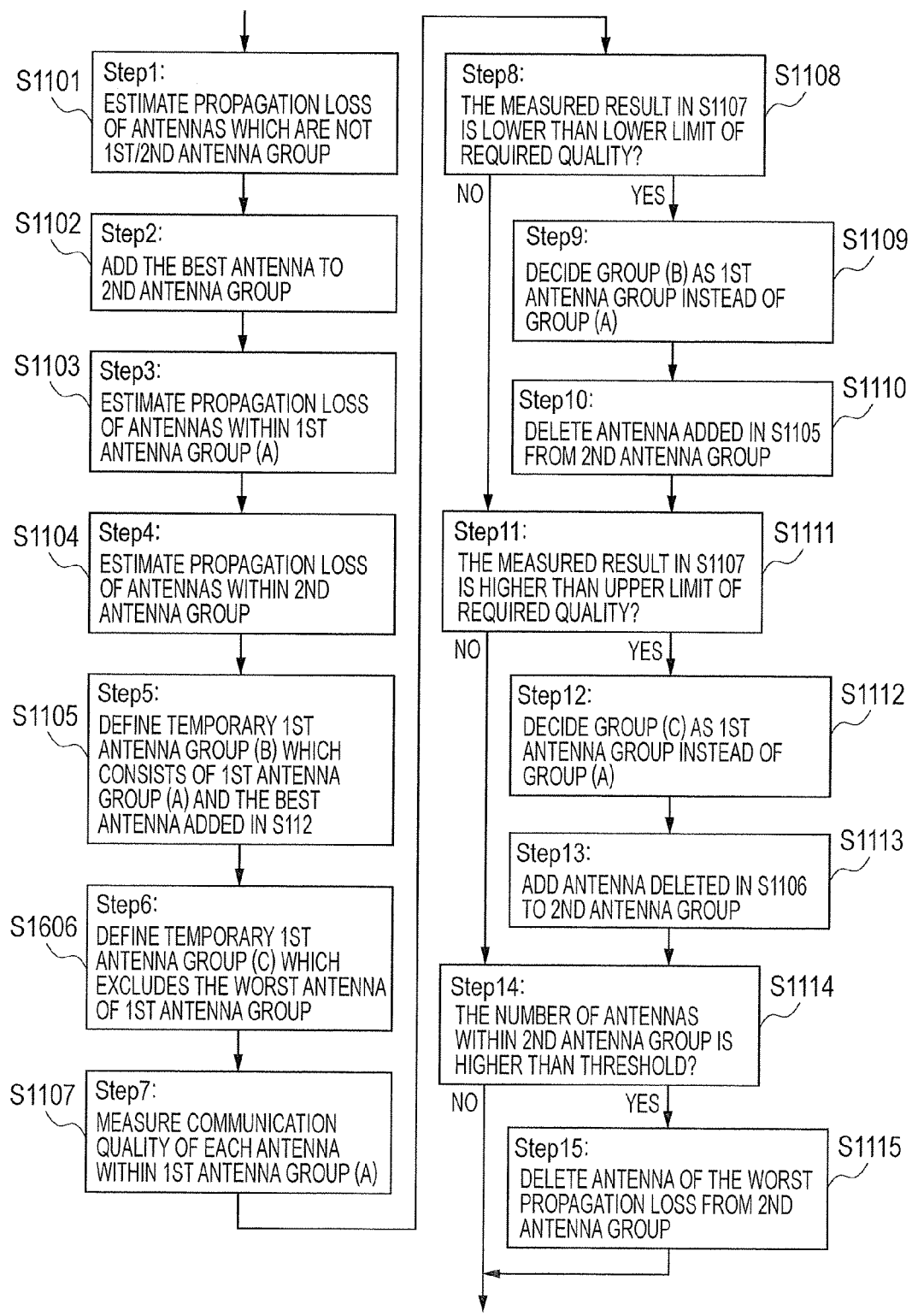
FIG. 7 is one example of a fixed procedure of a first antenna group and the second antenna group for each user equipment.

In Step 1 (S1001) of FIG. 6, the base station apparatus 1 measures the communication quality for each user equipment 4. In Step 2 (S1002), the base station apparatus 1 fixes a combination of the antennas within the first antenna group and the second antenna group based on the communication quality for each user equipment 4 estimated in Step 1. FIG. 7 shows concrete embodiment of Step 1 and Step 2.

FIG. 7 shows one example of a procedure which fixes the first antenna group and the second antenna group based on the communication quality estimated result for each user equipment 4. This procedure is performed for each user equipment 4.

In Step 1 (S1101) of this figure, the base station apparatus 1 estimates a propagation loss between the antenna and the user equipment 4 for the antenna which is within neither the first antenna group nor the second antenna group, for example, by referring to an antenna group table 116 which will be described later. A specific method of estimating the propagation loss will be explained later referring to FIG. 8 and FIG. 9. Here, either of the antenna 3 on the base station apparatus 1 side or the user equipment 4 may be assigned as a transmission source. If transmission powers of all the transmission sources are uniform, the propagation loss can be estimated for each antenna by subtracting the reception power from the transmission power. When the antenna 3 on the base station apparatus 1 side is assigned as a transmission source, the propagation loss corresponds to a difference between the transmission power of a signal transmitted from the antenna 3 and the reception power at the user equipment 4; when the user equipment is assigned as the transmission source, it corresponds to a difference between the transmission power of the signal transmitted from the user equipment 4 and the reception power at the antenna 3.

Step 2 (S1102) is a processing in which the base station apparatus 1 selects the antenna (best antenna) with the smallest propagation loss among the propagation losses estimated in Step 1, and adds it to the second antenna group. That is, this processing corresponds to an operation of adding the antenna which can be expected to have the highest reception power among the antennas within neither the first antenna group nor the second antenna group to the second antenna group. Incidentally, when there does not exist the antenna within neither the first antenna group nor the second antenna group in Step 1 and Step 2, that is, when the first antenna group and the second antenna group cover all the antennas, the antenna which will be newly added to the second antenna group does not exist.

In Step 3 (S1103) and Step 4 (S1104), the base station apparatus 1 estimates the propagation loss for each antenna within the first present antenna group A or the second antenna group, respectively, similarly with Step 1.

In Step 5 (S1105), the base station apparatus 1 selects the antenna with the smallest propagation loss estimated in Step 4 among the antennas within the second antenna group, adds this antenna to the current first antenna group A, and provisionally defines this group as a new first antenna group B.

In Step 6 (S1106), the base station apparatus 1 selects the worst antenna whose propagation loss estimated in Step 3 is the largest among the antennas within the first antenna group A, deletes this antenna from the current first antenna group A, and defines it as of a new first antenna group C provisionally. If the number of antennas within the current first antenna group is unity, the number of the antennas within the first antenna group will be set to zero by deleting the antenna. Since it is self-evident that this state cannot satisfy the required value of the communication quality, the deletion of the antenna is not performed. That is, the current first antenna group A is copied as the first antenna group C. The abovementioned processings of Step 5 (S1105) and Step 6 (S1106) are preparatory processings for antenna addition and deletion, and they may be performed later.

In Step 7 (S1107), the base station apparatus 1 estimates the communication quality when the base station apparatus 1 and the user equipment 4 communicate with each other using the current first antenna group A. As the communication quality, any index which indicates the communication quality quantitatively, such as the throughput, the SINR, the total reception power of the desired signal with respect to the terminal within the first antenna group on the base station apparatus 1 side, or the transmission/reception power of a signal transmitted from the first antenna group at the user equipment 4, as already described, shall be adopted. Incidentally, the communication quality may be estimated by the user equipment 4, and may be transmitted to the base station apparatus 1, as will be described later. Although the user equipment 4 in an initial state which passed through a procedure of FIG. 7 for the first time is one such that one antenna is added to the second antenna group in Step 2 and this antenna is within the first antenna group defined provisionally in Step 5, the number of antennas within the first antenna group emerging in Step 3 and after is zero. Therefore, the communication quality estimated in Step 7 will become zero. In Step 9 through which the process is sure to pass under this condition, the first antenna group B is fixed as a new first antenna group. Therefore, in the procedure of FIG. 7 in the next time and after, it is assured that the first antenna group A also exists to the user equipment 4.

In Step 8 (S1108), the base station apparatus 1 compares the communication quality estimated in Step 7 and the lower limit of the required value of the communication quality by this embodiment, if the former is lower than the latter, the process moves to a processing in Step 8, and if the former is not lower than the later, the process moves to a processing in Step 11.

Step 9 (S1109) and Step 10 (S1110) are a processing of adding a new antenna to the first antenna group because the communication quality with the first antenna group of the user equipment 4 was lower than the lower limit of the required value of the communication quality. In Step 9, the first antenna group B which is provisionally defined in Step 5 is fixed as a new first antenna group. Step 10 is an operation to delete the antenna which was provisionally moved to the first antenna group from the second antenna group in Step 5 from the second antenna group by seeing that the antenna is determinately moved to the first antenna group in Step 9.

In Step 11 (S1111), the base station apparatus 1 compares the communication quality estimated in Step 7 and the upper limit of the required value of the communication quality according to this embodiment. If the former exceeds the latter, the process will move to Step 12, and if the former does not exceed the latter, the process will move to a processing of Step 14. Incidentally, when in Step 8 and Step 11, both conditional branches are No, that is, when the communication quality estimated in Step 7 falls between the lower limit of the required value and the upper limit of the required value of the communication quality, the first antenna group is not renewed.

In Step 12 (S1112) and Step 13 (S1113), since the communication quality with the first antenna group of the user equipment 4 exceeds the upper limit of the required value of the communication quality, the antenna is deleted from the first antenna group. In Step 12, the first antenna group C provisionally defined in Step 6 is fixed as a new first antenna group. Step 13 is an operation of moving the antenna which is provisionally deleted from the first antenna group to the second antenna group from the first antenna group by seeing that the antenna is determinately deleted from the first antenna group in Step 13.

In Step 14 (S1114), the base station apparatus 1 determines whether the number of the antennas within the second antenna group exceeds a threshold decided in advance. If it exceeds the threshold, the process proceeds to Step 15; if it does not exceed the threshold, the procedure of FIG. 7 with respect to the user equipment 4 is finished.

Step 15 (S1115) is an operation whereby, when the number of the antennas within the second antenna group exceeds the threshold, the base station apparatus 1 deletes an antenna (the worst antenna) with the largest propagation loss from the second antenna group. Here, providing a restriction on the number of the antennas within the second antenna group contributes to reduction in the number of processings of propagation loss estimation to each antenna of the second antenna group in Step 4. The first antenna group and the second antenna group for each user equipment 4 are fixed by the above procedure. The base station apparatus 1 stores IDs of the antennas within the fixed first antenna group and IDs of the antennas within the second antenna group correspondingly to user equipment ID on an antenna group table which will be described later.

Thus, the base station apparatus 1 selects one or more antennas which should be within the antenna group based on the communication quality between the base station apparatus 1 and the user equipment 4 and the number of antennas within the antenna group, and communicates with the user equipment 4 through the first antenna group comprised of the selected antennas. The number of antennas within the antenna group is, for example, a number which assures the radio communication quality equal to or more than a constant level to the each user equipment 4 performing radio communication with the base station apparatus 1 and by which the base station apparatus 1 can increase the number of accommodatable pieces of the user equipment 4 under a condition which assures the radio communication quality. For example, it is a number such that the communication quality between the base station apparatus 1 and the user equipment 4 satisfies the lower limit of the required value of the communication quality and the number of antennas within the first antenna group is minimized, or the communication quality falls within a range which is defined by the lower limit of the required value and the upper limit of the required value of the communication quality.

Here, the description returns to an explanation of FIG. 6. After the base station apparatus 1 makes fixed the first antenna group and the second antenna group for each user equipment 4, the base station apparatus 1 waits until a timing to control shown in FIG. 5 comes in Step 3 (S1003). When the timing to control comes, in Step 4 (S1004), the base station apparatus 1 make the system reflect the first antenna group and the second antenna group fixed in Step 1 and Step 2. One example of a method of making the system reflect them will be given.

With a change of the first antenna group, if communication by the communication scheme in which a negotiation was held between the base station apparatus 1 and the user equipment 4 before the change cannot be continued, a negotiation of the communication scheme will be performed newly between the base station apparatus 1 and the user equipment 4. For example, with a change of the first antenna group, if the number of spatial layers used in MIMO communication and diversity communication (transmission diversity communication) is changed, a new negotiation will become necessary. This negotiation is realized by individual signaling (Dedicated Signaling) of the user equipment. This signaling method will be described later.

In Step 5 (S1005), on the premise that negotiation of the renewed antenna group in Step 4 has been finished between the base station apparatus 1 and the user equipment 4, the base station apparatus 1 performs the frequency and antenna resource allocation to the user equipment 4 in each time slot. In Step 6 (S1006), the base station apparatus 1 actually performs radio communication between the base station apparatus 1 and the user equipment 4 using the frequency and antenna resources which are allocated to the user equipment 4. A procedure of resource allocation to the user equipment 4 will be described in an explanation of FIG. 10 later.

Figure 8:
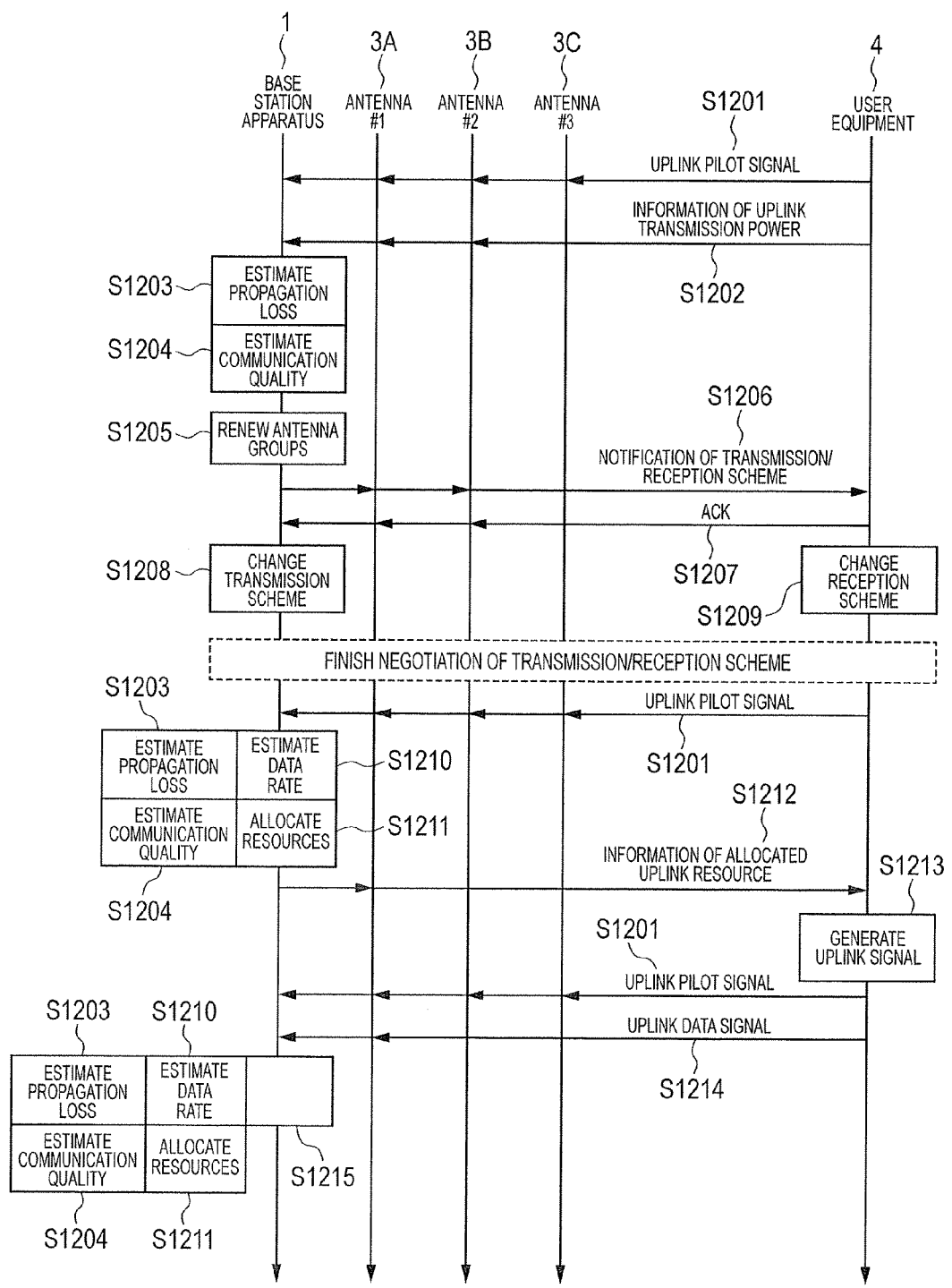
FIG. 8 is a first example of an operating sequence between the base station apparatus and the user equipment according to this embodiment.

FIG. 8 is a first example of a sequence diagram which describes signals and messages exchanged between the base station apparatus 1 and the user equipment 4 according to this embodiment. This figure show an example where antenna #1 and antenna #2 are within the first antenna group being set up for the user equipment 4 in a first half part thereof, and only antenna #1 is within the first antenna group in a second half part thereof. Moreover, this example is on the premise that the base station apparatus 1 estimates the communication quality using an uplink pilot signal from the user equipment 4. An example in the case of using a downlink pilot signal from the base station apparatus 1 will be described later.

The user equipment 4 transmits the pilot signal which is known on the base station apparatus 1 side (S1201). This pilot signal is received by respective antennas 3, and each of the received signals is inputted into the base station apparatus 1 as an individual signal of the each antenna 3. In order to perform the propagation loss estimation on the base station apparatus 1 side, the user equipment 4 transmits the control signal related to information of uplink transmission power, for example, together with the pilot signal (S1202).

The base station apparatus 1 performs demodulation and decoding on the control signal received with the antenna #1 and the antenna #2 which are of the first antenna group of the user equipment 4. For the demodulation of the control signal, the plot signals received with the antenna #1 and the antenna #2 are used. When the base station apparatus 1 succeeds in decoding the control signal, it can know an uplink transmission power from the user equipment 4.

The base station apparatus 1 estimates the propagation loss for each antenna 3 (S1203) by estimating the reception power of the uplink pilot signal for each antenna 3 using the uplink pilot signal from the user equipment 4 and subtracting this estimated value from an uplink transmission power. The base station apparatus 1 stores the estimated propagation loss for each antenna associating it with the user equipment ID and the antenna ID on a communication quality table which will be described later.

Once the propagation loss of each antenna 3 is successfully estimated, the first antenna group and the second antenna group can be decided by the procedure shown in FIG. 7. Although the communication quality measurement is performed in Step 7 (S1107) of that procedure, this step corresponds to S1204 in FIG. 8. Moreover, a stage where the procedure of FIG. 7 is finished, and the timing to control is waited in Step 3 of FIG. 6, and the first antenna group and the second antenna group are reflected in Step 4 corresponds to Step S1205 in FIG. 8.

The base station apparatus 1 notifies the uplink communication scheme decided based on the number of antennas within the first antenna group to the user equipment 4 as control information (S1206). The negotiation of the transmission/reception scheme between the base station apparatus 1 and the user equipment 4 is finished by the base station apparatus 1 receiving an ACK (Acknowledgement) response from the user equipment 4 (S1207). At this time, the contents which are notified from the base station apparatus 1 include two points: the number of uplink transmission spatial layers, and an indicator for indicating either transmission scheme of MIMO space division multiplexing or the diversity communication. As the indicator for indicating the transmission scheme, there can be described Transmission Mode currently disclosed in 3GPP, "Evolved Universal Terrestrial Radio Access (E-UTRA); Physical layer procedures," TS36.213, v9.0.1, 2009/12, as an example. Transmission Mode enables either of the diversity communication or the MIMO space division multiplexing to be specified for each user equipment individually.

Moreover, as was described in the explanation of FIG. 6, only when a change occurs in these communication schemes, anew negotiation is required, and a new negotiation is not required for an other user equipment 4, specifically, the user equipment 4 whose first antenna group is not changed, and the user equipment 4 whose number of spatial layers etc. is not changed even if the first antenna group is changed. As methods of performing the negotiation, there is RRC Connection Reconfiguration Procedure currently disclosed in 3GPP, "Evolved Universal Terrestrial Radio Access (E-UTRA); Radio Resource Control (RRC); Protocol specification," TS36.331, v9.1.0, 2009/12. An information element of RadioResourceConfigDedicated::PhysicalConfigDedicated::AntennaInfoDedicated in an RRCConnectionReconfiguration message transmitted toward the user equipment 4 from the base station apparatus 1 has an interface for specifying the above-mentioned Transmission Mode. Since the RRCConnectionReconfiguration message is a message destined for individual user equipment, it can specify Transmission Mode for each user equipment 4.

If this 3GPP, "Evolved Universal Terrestrial Radio Access (E-UTRA); Radio Resource Control (RRC); Protocol specification," TS36.331, v9.1.0, 2009/12 is followed, a notification of S1206 corresponds to the RRCConnectionReconfiguration message transmitted to the user equipment 4 from the base station apparatus 1, and a notification of S1207 corresponds to an RRCConnectionReconfigurationComplete message transmitted to the base station apparatus 1 from the user equipment 4.

Incidentally, in a stage of performing the negotiation, the number of spatial layers before the antenna group change is applied and either of communication schemes of the MIMO communication and the diversity communication is applied. In the example of this figure, since the antenna #1 and the antenna #2 are designated to be of the first antenna group before the first antenna group change, the base station apparatus 1 communicates with the user equipment 4 using these antennas. After the negotiation is finished, since the first antenna group is changed to include only the antenna #1, only the antenna #1 will be used for communication of the control signal and the data signal after this.

After the negotiation is finished, a normal operation is performed until the next timing to control comes. The user equipment 4 transmits the uplink pilot signal (S1201), and the base station apparatus 1 estimates the uplink data rate (S1210) in order to perform adaptive modulation of the uplink data signal, while continuing the propagation loss estimation (S1203) and communication quality estimation (S1204) which prepares for the next timing to control (S1210). Based on an estimated result of the uplink data rate about each user equipment 4 including what is not illustrated in the figure, the base station apparatus 1 allocates uplink communication resources to the respective user equipment 4 (S1211).

The base station apparatus 1 specifies frequency resources, such as a subcarrier, the antenna 3 resource on the base station apparatus 1 side, and a modulation scheme and a coding rate when using these resources at the time of allocating communication resources. The information which should be notified to the user equipment 4 among these pieces of information are information of frequency resource, the modulation scheme, and the coding rate. This is because these pieces of information specify the transmission scheme at the base station apparatus 1, and specifies transmission scheme to the user equipment 4, which will be notified to the user equipment 4. Since the antenna with which the base station apparatus 1 receives the uplink signal from the terminal only specifies the reception scheme on the base station apparatus 1 side, it is not necessary to inform it to the user equipment 4 side. Incidentally, although a transmission timing from the user equipment 4 may be notified because it specifies the transmission scheme, it becomes unnecessary to notify the transmission timing by adopting a protocol of transmitting the uplink signal a fixed time later after the user equipment 4 received this notification.

As described above, the base station apparatus 1 puts together the information of frequency resource allocated to the user equipment 4, the modulation scheme to apply, and the coding rate collectively and notifies it to the user equipment 4 as information of allocated uplink resource (S1212).

The user equipment 4 which received the information of allocated uplink resource decides the transmission timing and the frequency according to this information, generate the data signal in compliance with the modulation scheme and the coding rate which it applies, and transmits it toward the base station apparatus 1 together with a pilot signal which is used for data decoding (S1201, S1214). The base station apparatus 1 decodes the received data signal after demodulating it using the pilot signal, and extracts the data signal which is transmitted (S1215). Incidentally, as the pilot signal for data decoding, it may be also used as a pilot for communication quality estimation or data rate estimation, and each of them may be a separate pilot signal. In all cases, the pilot for communication quality estimation or the data rate estimation is transmitted from the user equipment 4, the propagation loss estimation (S1203), the communication quality estimation (S1204), the uplink data rate estimation (S1210), and the uplink resource allocation (S1211) are performed in the base station apparatus 1 in parallel to the above-mentioned data decoding.

Figure 9:
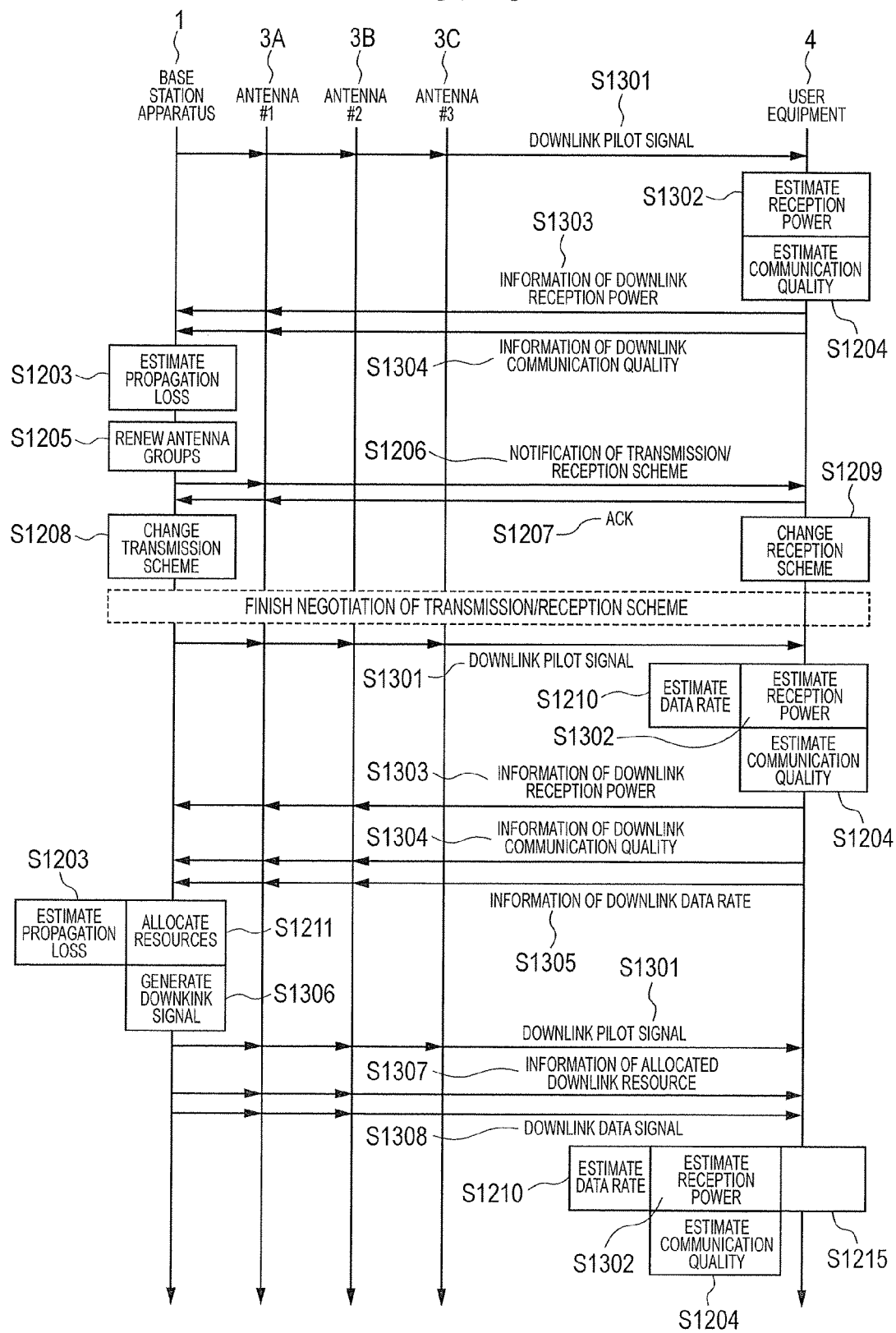
FIG. 9 is a second example of the operating sequence between the base station apparatus and the user equipment according to this embodiment.

FIG. 9 is a second example of a sequence diagram describing a signal and a message which are exchanged between the base station apparatus 1 and the user equipment 4 according to this embodiment. This diagram shows an example in which in the first half of it, only the antenna #1 is of the first antenna group being set up for the user equipment 4, and in the last half of it, the antenna #1 and the antenna #2 become of the first antenna group. Moreover, this example is on the premise that the user equipment 4 estimates the communication quality using the downlink pilot signal from the base station apparatus 1.

The base station apparatus 1 transmits an antenna specific pilot signal from each antenna 3 (S1301). The user equipment 4 estimates the reception power of the antenna specific pilot signal (S1302). Furthermore, it performs estimation of the downlink communication quality similarly with the example of FIG. 8 (S1204). Information of reception power for each antenna 3 which the user equipment 4 estimated and communication quality information are fed back to the base station apparatus 1 (S1303, S1304).

The base station apparatus 1 estimates the propagation loss for each antenna and for each user equipment from a difference between the information of reception power fed back from the user equipment 4 and the transmission power for each antenna which the base station apparatus 1 manages by itself (S1203). After this step until negotiation of the transmission/reception scheme between the base station apparatus 1 and the user equipment 4 is finished, the sequence is the same as the sequence of FIG. 8 except that the communication quality information is obtained by the feedback from the user equipment 4.

After the negotiation is finished, it does a normal operation until the next timing to control comes. The base station apparatus 1 transmits the downlink pilot signal (S1301), and the user equipment 4 estimates the downlink data rate (S1210) in order to perform adaptive modulation on a downlink data signal while continuing estimation of the reception power (S1302) and estimation of the communication quality (S1204) that are done to prepare the next timing to control. It feeds back information of reception power, information of communication quality, and information of downlink data rate which the user equipment 4 estimates to the base station apparatus 1 (S1303, S1304, S1305).

The base station apparatus 1 which received these pieces of feedback information performs resource allocation in each time slot (S1211) based on the estimation information of downlink data rate, while continuing the propagation loss estimation (S1203) until the next timing to control. At the time of communication resource allocation, the base station apparatus 1 specifies frequency resources, such as a subcarrier, an antenna 3 resource on the base station apparatus 1 side, and the modulation scheme and the coding rate when using these resources. Pieces of information which should be notified to the user equipment 4 among these are the information of frequency resource allocation, the modulation scheme, and the coding rate. While these are for specifying the transmission scheme in the base station apparatus 1, and these are for specifying the reception scheme to the user equipment 4. If being on the premise that the communication scheme negotiated between the base station apparatus 1 and the user equipment 4 in advance is not changed, it is not necessarily required for the user equipment 4 to know the antenna with which the base station apparatus 1 transmits the downlink signal to the user equipment 4.

This is because if the negotiation is established between the base station apparatus 1 and the user equipment 4 as to only performing the four layer MIMO communication, for example, even when the base station apparatus 1 uses five antennas or more, the user equipment 4 does not need to make itself meet the transmission scheme in this embodiment. That is, the base station apparatus 1 side will perform the transmission scheme being negotiated in advance using all the antennas allocated to the user equipment 4 in each time slot. For example, when the base station apparatus 1 allocates five antennas to the user equipment 4 with which the base station apparatus 1 negotiates to perform the four layer MIMO communication in a certain time slot, four layer transmission is performed with four antennas among five antennas, and the fifth antenna transmits completely the same data signal and pilot signal for data decoding as those of one antenna among the four antennas. What is necessary is just to receive the signals with four antennas on four spatial layers on the user equipment 4 side.

After the communication resource allocation (S1211) to the user equipment 4 is finished, according to the communication resource allocation result, the base station apparatus 1 generates a downlink transmission signal to each user equipment 4 (S1306). Then, it transmits information of resource allocation, the data signal, and the pilot signal to the user equipment 4 (S1301, S1307, S1308).

Using the information of resource allocation, the data signal, and the pilot signal which were transmitted from the base station apparatus 1, the user equipment 4 decodes the downlink data signal. Specifically, after decoding the information of resource allocation using the pilot signal, the data signal is decoded (S1215) by referring to the frequency information, the modulation scheme, and the coding rate which are stored in this information (S1215). At this time, the reception power estimation (S1302), the communication quality estimation (S1204), and the data rate estimation (S1210) are continued using the pilot signal.

Figure 10:
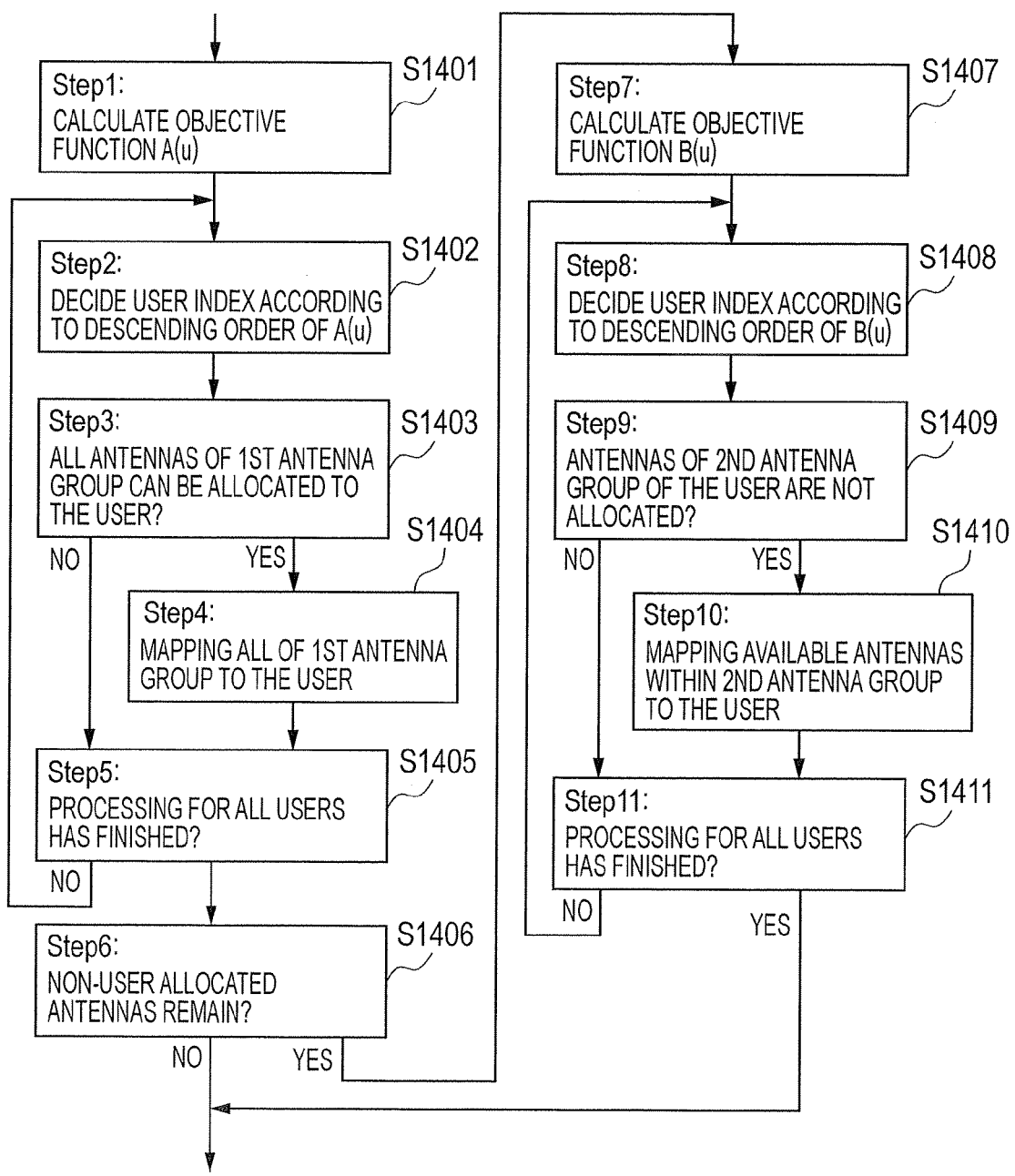
FIG. 10 is one example of an antenna allocation procedure to each user equipment according to this embodiment.

FIG. 10 is an explanatory diagram of a method of allocating the antennas to each user equipment 4 in each time slot from the first antenna group and the second antenna group of the each user equipment 4 according to this embodiment. The figure shows a detailed flowchart of a processing of the above-mentioned Step S1006. The flowchart of FIG. 10 is performed for each frequency resource. As an entire flow, all the antennas of the first antenna group are mapped to the user equipment 4 as much as possible under a condition that the allocated antennas do not overlap between the user equipment 4, and a part of or all of the antennas of the second antenna group of each user equipment 4 which have not been mapped to any user equipment 4 are allocated. For antennas which have not been mapped to any user equipment 4 in this stage, muting is performed in the time slot.

In Step 1 (S1401), the base station apparatus 1 calculates an objective function value A(u) for packet scheduling. u indicates an index of the user equipment 4. As a scheduling algorithm, proportional fairness is mentioned, for example. The proportional fairness defines an objective function by a numerator divided by a denominator in which the numerator is an instantaneous estimated data rate and the denominator is an average data rate which could be provided to the user equipment in the case where the user equipment 4 uses all the antennas of the first antenna group and communication is performed between the base station apparatus 1 and the user equipment 4 with a transmission/reception scheme which has been negotiated therebetween in advance. It is indicated that the larger this value is, the higher the ratio of the estimated instantaneous data rate to the average transmission rate. By distributing the communication resource to the user equipment 4 with this value being high, a system spectral efficiency higher than that of a simple round robin scheduler can be attained through the so-called user diversity effect.

The instantaneous estimated data rate is estimated in S1210 of FIG. 8 and FIG. 9. In the case of FIG. 9, the estimated result in the user equipment 4 is transmitted to the base station apparatus 1 as feedback information in S1305. The average data rate of the denominator is calculable from the resource allocation actual result to each user equipment 4 in the base station apparatus 1.

In Step 2 (S1402), the base station apparatus 1 specifies the index of the user equipment 4 in decreasing order of objective function value calculated in Step 3 to Step 5 are processings to the index of a certain user equipment 4, and when a series of processings is finished, the process returns to Step 2, where the index of an other user equipment 4 whose objective function value is higher next is specified.

In Step 3 (S1403), the base station apparatus 1 determines whether all the antennas within the first antenna group of the user equipment 4 specified in Step 2 are allocatable in the frequency resource. If at least one antenna is already allocated to an other user equipment 4, it will be determined that the allocation is impossible and the process will proceed to Step 5. If the allocation is possible, the process will proceed to Step 4. Incidentally, the first antenna group of the specified user equipment 4 can be distinguished by referring to the antenna group table. For the second antenna group in the following processing, a situation is the same. The user equipment 4 being determined non-allocatable will be allocated the first antenna group, for example, in an other time slot and in an other frequency resource.

In Step 4 (S1404), the base station apparatus 1 fixes allocation of all the antennas of the first antenna group of the user equipment 4 specified in Step 2 as the antenna resource for the user equipment. This operation makes it impossible for any other user equipment 4 to use the antennas which have been allocated to the user equipment 4 in this step in the same frequency resource of the time slot.

In Step 5 (S1405), the base station apparatus 1 determines whether processings of Step 3 and Step 4 have finished with respect to all pieces of the user equipment 4. If they have finished, the process will proceed to Step 6. If it has not finished, the process returns to Step 2 in order to specify an other user equipment 4.

In Step 6 (S1406), the base station apparatus 1 determines whether any user equipment 4 has been mapped to all the antennas by no later than Step 5, or there remains any antenna to which the user equipment 4 has not been mapped. When anyone of the user equipment 4 is allocated to all the antennas by no later than Step 5, since there does not remain an antenna allocatable to the user equipment 4 in the time slot and in the frequency resource, antenna allocation in the frequency resource is ended and the allocation in another frequency resource is started. When there remains an antenna to which the user equipment 4 has not been mapped, the process proceeds to Step 7 in order to make an additional allocation from the second antenna group.

In Step 7 (S1407), the base station apparatus 1 calculates the objective function value B(u) for determining to which user equipment 4 the additional allocation of the antenna from the second antenna group is made. As one example, there is considered an objective function with the communication quality estimated in S1204 of FIG. 8 and FIG. 9 as a denominator and with the lower limit of the required value of the communication quality as a numerator. This objective function shows a higher value as the communication quality of the user equipment 4 becomes a lower value to the lower limit of the required value, and this is aimed at making it easier to make the additional allocation of the antenna from the second antenna group to the user equipment 4 whose communication quality is close to (or lower than) the lower limit of the required value of the communication quality.

Step 8 (S1408) is the same operation as Step 2. Specifically, the base station apparatus 1 specifies an index of the user equipment 4 in decreasing order of objective function value calculated in Step 7. Step 9 to Step 11 are processings to the index of the specified user equipment 4. When a series of processings is finished, the process returns to Step 8, and an index of a different user equipment 4 having a next high objective function value is specified.

In Step 9 (S1409), the base station apparatus 1 determines whether at least one antenna can be allocated in the frequency resource among antennas within the second antenna group of the user equipment 4 specified in Step 8. If all the antennas within the second antenna group are already allocated to other user equipment 4, it will be determined that allocation is impossible, and the process will proceed to Step 11. If the allocation is possible, the process will proceed to Step 10.

In Step 10 (S1410), the base station apparatus 1 fixes the allocation of one (or may be more than one) of the antennas which were determined to be allocatable in Step 9 within the second antenna group of the user equipment 4 specified in Step 8 as an antenna resource for the user equipment. This operation disables any other user equipment 4 from using the antenna in this step which has been allocated to the user equipment 4 in the same frequency resource of the time slot.

In Step 11 (S1411), the base station apparatus 1 determines whether processings of Step 9 and Step 10 have finished with respect to all pieces of the user equipment 4. If it has finished, the base station apparatus 1 ends allocation in the frequency resource. If it has not finished, the process returns to Step 8 in order to specify another user equipment 4.

Figure 11:
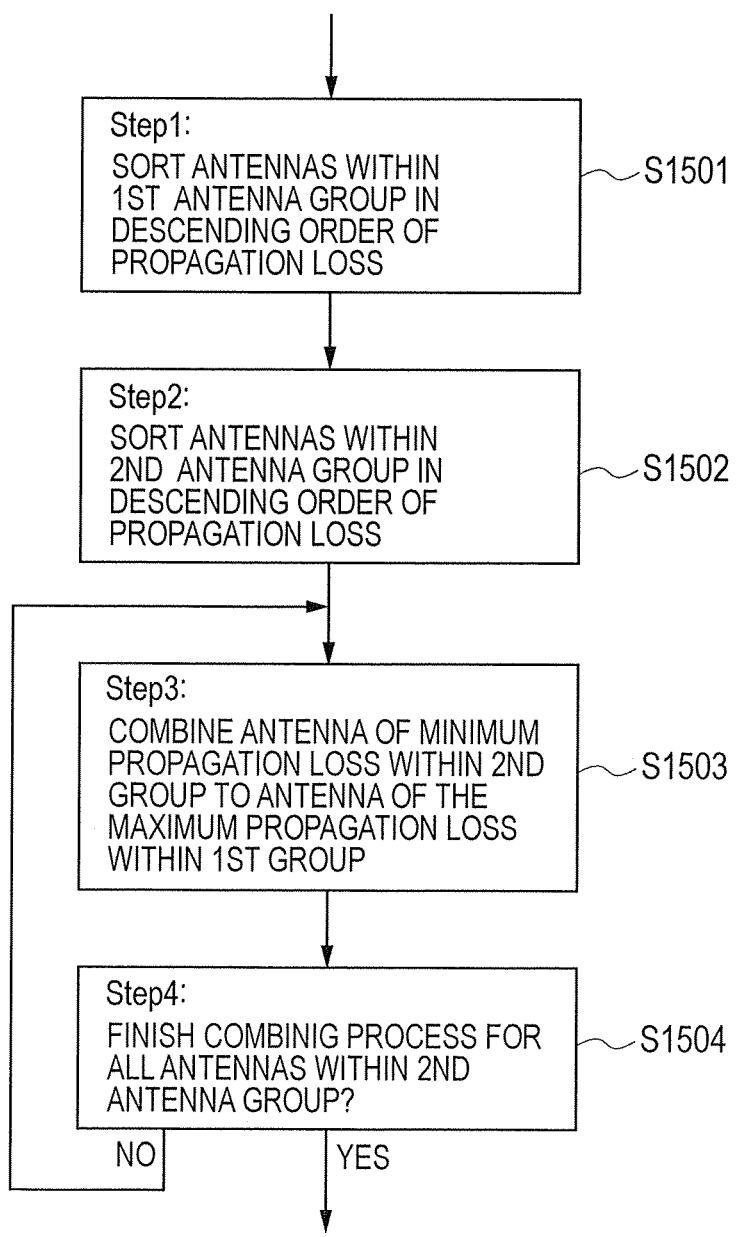
FIG. 11 is one example of a data transmission preparation procedure in the case where the second antenna group is subserviently allocated to the user equipment according to this embodiment.

FIG. 11 shows a preparation procedure for performing data signal transmission related to the user equipment 4 to which the second antenna group is allocated subserviently. Since a communication scheme on which negotiation is established between the base station apparatus 1 and the user equipment 4 is a communication scheme in the case of using only the first antenna group, this procedure aims at improving a reached signal power to the receiver side in compliance with the previously negotiated communication scheme (for example, the number of spatial layers) by combination the antenna added from the second antenna group to the antennas of the first antenna group.

In Step 1 (S1501) and Step 2 (S1502), the base station apparatus 1 sorts all the antennas of the first antenna group and the antennas allocated to the terminal in the time slot and in the frequency resource by a procedure shown in FIG. 10 among the antennas within the second antenna group in decreasing order of propagation loss. Sorting in descending order has no special meaning, and is just to make it easy to search the antenna with the largest propagation loss or the smallest propagation loss.

In Step 3 (S1503), the base station apparatus 1 combines the antenna with the largest propagation loss within the first antenna group (being designated as an antenna A) and the antenna with the smallest propagation loss within the second antenna group (being designated as an antenna B). That is, the antenna B is made to output completely the same data signal and pilot signal for data decoding as those of the antenna A.

This is called combination of antennas in this embodiment. The propagation loss related to the antenna A of the first antenna group to which the antenna B is combined is renewed temporarily only during a procedure operation of FIG. 11. Indicating the propagation loss in a decibel value, each propagation loss value multiplied by −1 is converted into a linear value, which is returned to a decibel value and is multiplied by −1, whereby propagation loss values are combined.

The above operations are repeated until all the antennas of the second antenna group are combined to any one of the antennas of the first antenna group, and a termination determination is made in Step 4 (S1504). Information of each antenna allocated to the user equipment 4 and information as to which antenna is combined to which antenna are notified to a baseband signal transmitter 102 which will be described later.

Figure 12:
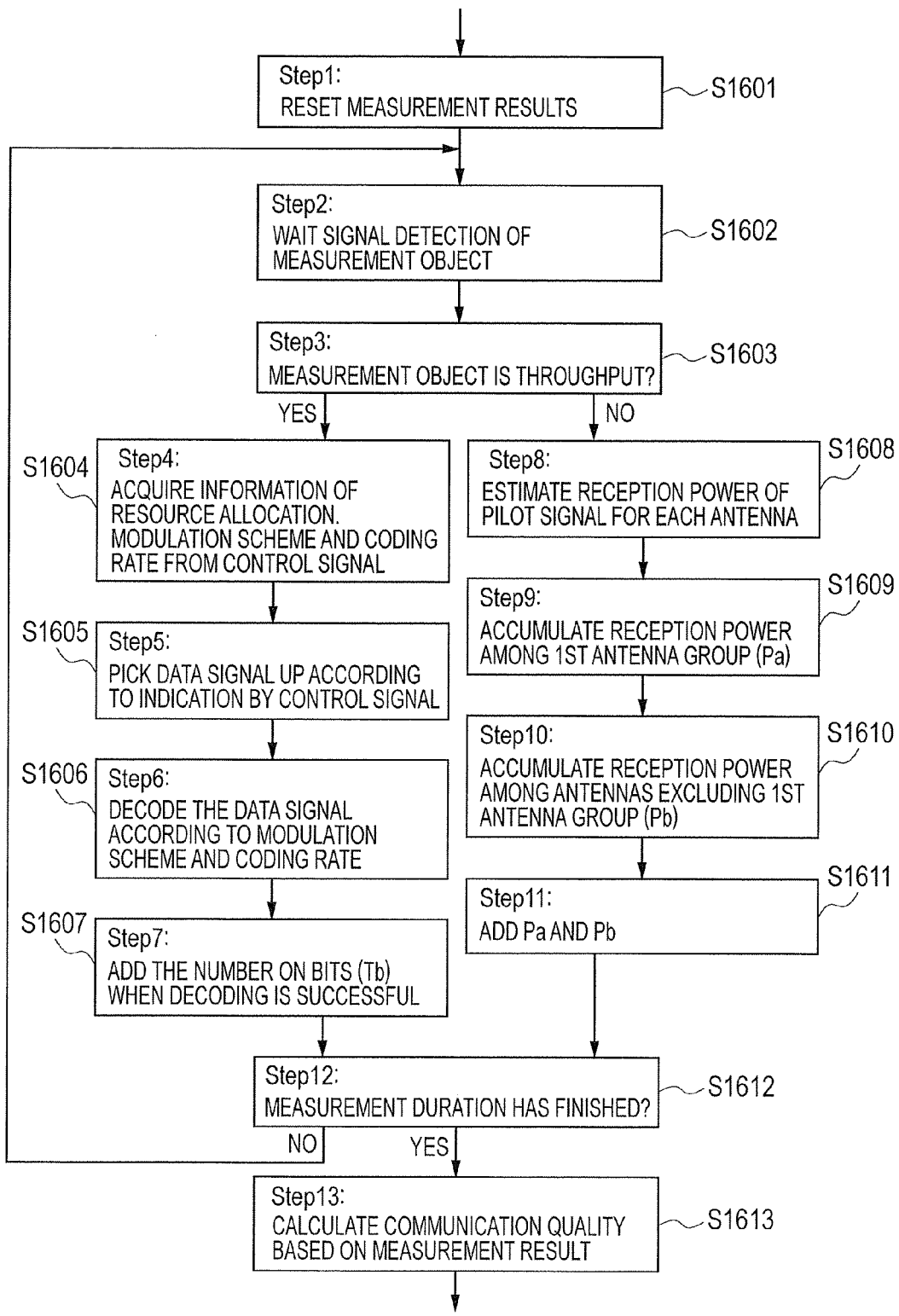
FIG. 12 is one example of a method of estimating communication quality according to this embodiment.

FIG. 12 explains a method of estimating communication quality according to this embodiment. This figure is described so as to be applicable to either case where the measurement entity performing the communication quality estimation is either the base station apparatus 1 or the user equipment 4. An entity (transmission entity) which transmits the pilot signal and the data signal which will become measurement objects of the communication quality is different from the measurement entity. That is, if the measurement entity is the base station apparatus 1, the transmission entity which transmits a signal of the measuring object will be the user equipment 4; on the other hand, if the measurement entity is the user equipment 4, the transmission entity which transmits the signal of the measuring object will be the base station apparatus 1. Incidentally, the measuring period shall be the same length as the interval between timings to control shown in FIG. 5. The flowchart shown in FIG. 12 will be processed for each user equipment 4, if the measurement entity is the base station apparatus 1; it will be processed individually within the each user equipment 4, if the measurement entity is the user equipment 4.

In Step 1 (S1601), the measurement entity resets various measured value at a timing at which the measuring period begins. When measuring the throughput, the number of bits Tb which succeeded in the data communication is reset to zero. When measuring the SINR and the reception power, the following powers are reset to zero: the total reception power of the downlink pilot signal at the user equipment 4 transmitted from the antenna of the first antenna group, or the total reception power Pa of the uplink pilot signal at the antenna of the first antenna group transmitted from the each user equipment 4; and the transmission/reception power Pb related to the antennas of other than the first antenna group.

In Step 2 (S1602), the measurement entity performs an operation of waiting until the signal of the measuring object is detected by the measurement entity side. If it is the pilot signal, since the measurement entity side has also known the transmission timing, it starts receiving the pilot signal which is a measuring object signal being timed to the already known transmission timing. If it is the data signal, the information of resource allocation will serve as a key to determine a data signal receiving timing. In the case where the measurement entity is the base station apparatus 1, it is known that a fixed time later after the base station apparatus 1 transmitted the information of resource allocation to the user equipment 4, for example, after eight time slots, the data signal is transmitted from the user equipment 4 using the frequency resource, the modulation scheme, and the coding rate which were specified by the information of resource allocation. On the other hand, when the measurement entity is the user equipment 4, the user equipment 4 performs blind decoding on the information of resource allocation, and if it detects the information of resource allocation destined for the user equipment 4, it will be made clear that the data signal destined for the user equipment 4 is transmitted using the frequency resource, the modulation scheme, and the coding rate which the information of resource allocation specifies in the same time slot.

In Step 3 (S1603), the measurement entity determines whether the measuring object is a throughput. Essentially, this is an operation to discriminate whether the data signal is set to be the measuring object, or the pilot signal is set to be the measuring object. If the measuring object is the throughput, the process will proceed to Step 4 in order to decode the data signal. If the measuring object is the SINR or the reception power other than the throughput, the process will proceed to Step 8 in order to perform estimation of the communication quality using the pilot signal.

In Step 4 (S1604), the measurement entity acquires information of frequency resource which the data signal is arranged, the modulation scheme, and the coding rate by referring to the information of resource allocation as preparation for starting decoding of the data signal. In the case where the measurement entity is the base station apparatus 1, since the base station apparatus 1 has issued by itself the information of resource allocation, it will refer to information currently recorded in the inside of the base station apparatus 1. On the other hand, in the case where the measurement entity is the user equipment 4, the information of resource allocation is acquired by blind decoding in the user equipment 4.

In Step 5 (S1605), the measurement entity extracts the data signals related to the user equipment 4 from the entire received signal based on information of frequency resource allocation stored in information of resource allocation. In Step 6 (S1606), from the data signal extracted in Step 5, the measurement entity reads the modulation scheme and the coding rate related to the data signal within the information of resource allocation, and decodes the data signal. Whether the decoding is successfully performed is determined by checking an error detecting code added to the data signal. In Step 7 (S1607), when the measurement entity determined that decoding is succeeded according to a determination result of decoding success in Step 6, it adds the number of bits which succeeded in the decoding to the number of bits Tb which succeeded in the data communication. Then, the process moves to Step 12 (S1612).

On the other hand, in Step 8 (S1608), the measurement entity measures the reception power of the pilot signal for each antenna 3 on the base station apparatus 1 side. Step 9 (S1609) is a processing where the measurement entity totals the reception powers related to the antennas within the first antenna group among the reception powers of the respective antennas which were measured in Step 8 and designates it as Pa. Step 10 (S1610) is a processing where the measurement entity totals the reception powers related to the antennas not within the first antenna group among the reception powers of the respective antennas which were measured in Step 8 and designates it as Pb. Step 11 (S1611) is a processing where the measurement entity accumulates Pa and Pb which were calculated in Step 9 and Step 10 in the measurement section. Then, the process moves to Step 12 (S1612).

In Step 12 (S1612), the measurement entity determines whether the processing is finished in the measurement section, and if it was not finished in the measurement, the process returns to Step 2, and the measurement entity waits for reception of the next measuring object signal. If the processing is finished in the measurement section, the process will proceed to Step 13.

In Step 13 (S1613), the measurement results Tb, Pa, and Pb are averaged, and it is outputted as the communication quality estimated result. Denoting the temporal length of the measuring section as T, calculation can be done by the following formulas: for the throughput, by Tb/T; for the total reception power related to the first antenna group, by Pa/T (or Pa/(accumulated number)); and for the SINR, by Pa/Pb although it is an approximation using the SIR.

FIG. 13 is an explanatory diagram about contents of the control message transmitted between the base station apparatus 1 and the user equipment 4 according to this embodiment.

FIG. 13A is an example of a notification of transmission/reception scheme (S1206 of FIG. 8 and FIG. 9) which is transmitted to the user equipment 4 from the base station apparatus 1. Regarding the notification of transmission/reception scheme (S1206), since the number of spatial layers which are transmittable to the user equipment 4 increases and decreases to the user equipment 4 with a change of the first antenna group, the notification of the number of spatial layers becomes necessary. Although it is within the range of values 1 to 4 in this embodiment, this range of values is dependent on the system. Moreover, practicing a protocol that specifies a range of 0 to 3 in order to reduce the amount of bits and makes the receiving side interpret it as a range of 1 to 4 is desirable, which can be easily thought of by those in the art. Moreover, together with notification of the number of spatial layers, there may be added an indicator for indicating which transmission scheme should be used: multiple spatial layers are transmitted by the space division multiplexing (being written as SDM); or transmission is performed by the diversity communication (being written as Diversity).

FIG. 13B is an example of information of downlink reception power (S1303 of FIG. 9) transmitted to the base station apparatus 1 from the user equipment 4. The number of antennas shown in the first field is one that shows the number of pieces of the information of downlink reception power which starts from the second field continuing later and decides the length of fields of the information of downlink reception power. It corresponds to the number of pilot signals specific to each antenna 3 on the base station apparatus 1 side. In the second field and the following fields, the downlink reception powers for respective antennas estimated by the user equipment 4 are stored as a set of the antenna ID and the downlink reception power.

FIG. 13C is an example of the information of uplink transmission power (S1202 of FIG. 8) transmitted to the base station apparatus 1 from the user equipment 4. The content to notify is only the uplink transmission power of the user equipment 4.

FIG. 13D is an example of information of downlink communication quality (S1304 of FIG. 9) which is transmitted to the base station apparatus 1 from the user equipment 4. The first field is an indicator for indicating the category of communication quality information, which corresponds to the throughput, the SINR, the reception power, etc. A method of assigning numerals to the kinds and practicing a protocol in which both the transmitter and the receiver share a numeral assignment rule can be easily thought of if those in the art consider the case. The second field stores a value of the communication quality specified in the first field.

Figure 14:
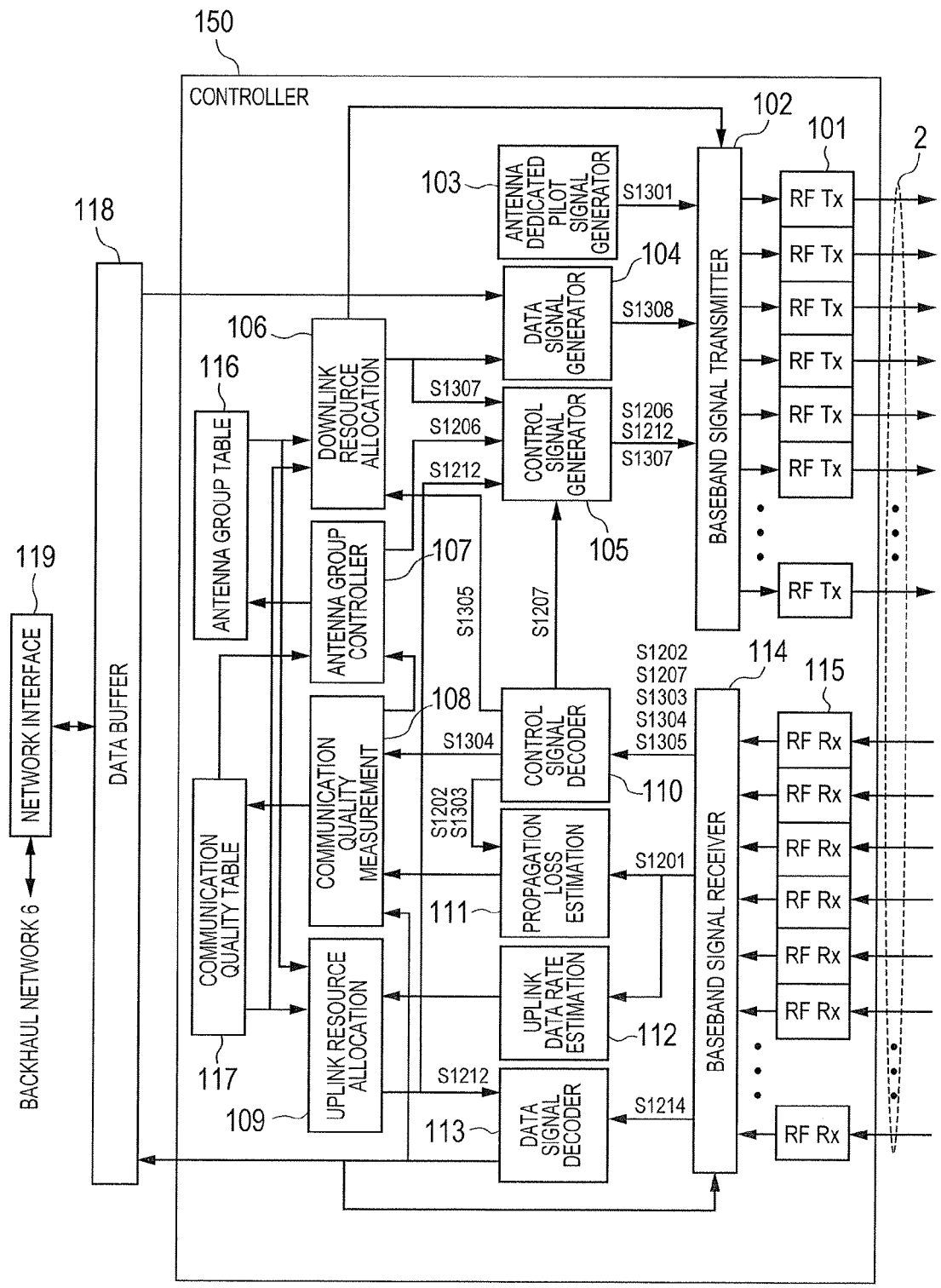
FIG. 14 is a configuration example of the base station apparatus according to this embodiment.

FIG. 14 shows a block configuration diagram of the base station apparatus 1 according to this embodiment.

The base station apparatus 1 has a network interface 119, a data buffer 118, and a controller 150, for example. The controller 150 includes blocks 101-117 shown in FIG. 14, for example. Incidentally, the controller 150 can have a communication processor (for example, a block other than an antenna group controller 107) for communicating with the user equipment 4 and the antenna group controller 107, for example.

The RF signal transmitter 101 has a function of converting the inputted baseband digital signal into an analog signal with the digital-analog converter, converting it into a radio frequency signal (RF signal) with the up-converter, and outputting the RF analog signal. Its output destination is the antenna cable 2.

The baseband signal transmitter 102 arranges a pilot symbol specific to each antenna which an antenna dedicated pilot signal generator 103 generates, a pilot symbol for decoding used for data symbol decoding and a data symbol which the data signal generator 104 generates, and a control symbol which the control signal generator 105 generates in a resource element which includes time, frequency, and antenna axes, and generates baseband signals which are outputted from respective antennas. This operation includes processings of layer mapping, pre-coding, and IFFT (Inverse Fast Fourier Transform) in an OFDMA-MIMO communication system. Combination of the antenna of the second antenna group to the antenna of the first antenna group shown in FIG. 11 is performed in this baseband signal transmitter 102. A method of performing this combination will be described later.

The antenna dedicated pilot signal generator 103 has a function of generating a pilot symbol specific to the antenna and outputting it to the baseband signal transmitter 102. The downlink pilot signal which is transmitted in S1301 of the sequence diagram of FIG. 9 is generated here.

A data signal generator 104 reads the data sequence destined for the user equipment 4 to which the resources are allocated from the data buffer 118 using the modulation scheme and the coding rate instructed from a downlink resource allocation 106, and performs the coding and the modulation on it. Since the number of symbols to be transmitted to the user equipment 4 is decided from the frequency resource allocation result, it performs rate matching so that the modulation symbols may be outputted as much as this number of the symbols. Moreover, it also generates the pilot symbol for data symbol decoding. The data symbol and the pilot symbol for data symbol decoding which are generated in the data signal generator 104 correspond to the downlink data signal (S1308) of the sequence diagram of FIG. 9.

A control signal generator 105 receives inputs of the downlink allocation frequency resource for each user equipment 4 which the downlink resource allocation 106 generates, the modulation scheme, and the coding rate, and generates the control symbol including information of allocated downlink resource (corresponding to S1307 of FIG. 9). Furthermore, it generates the control symbol including the notification of transmission/reception scheme (S1206 of FIG. 8 and FIG. 9) which the antenna group controller 107 generates. In addition, it generates the control symbol for notifying the allocated frequency resource in the uplink communication for each user equipment 4 which an uplink resource allocation 109 generates, the modulation scheme, and the coding rate to the user equipment 4 (S1212 of FIG. 8).

The downlink resource allocation 106 allocates the antenna and frequency resources to each user equipment 4 in accordance with a resource allocation scheme shown in FIG. 10 and FIG. 11. In allocating the resources to the user equipment 4, the downlink resource allocation 106 reads the first antenna group and the second antenna group of each user equipment 4 from the antenna group table 116, reads the propagation loss and the communication quality from the communication quality table 117, and inputs an estimated value of a downlink instantaneous data rate which is decoded by the control signal decoder 110 because the downlink instantaneous data rate estimated by the user equipment 4 is transmitted as an uplink control signal. Outputs are the frequency resource which is allocated to the user equipment 4, the antenna, the modulation scheme, and the coding rate all of which are for the data signal generator 104. The downlink resource allocation 106 outputs the frequency resource, the modulation scheme, and the coding rate all of which are for a control signal generator 105 in order to generate the control symbols for specifying the frequency resource, the modulation scheme, and coding rate such that the data signal is stored in the user equipment 4. Moreover, in order to perform antenna combination shown in FIG. 11, the downlink resource allocation 106 notifies a combination of the antennas to be combined to the baseband signal transmitter 102 and controls so that multiple antennas may output the same data signal and pilot signal for data decoding. This control will be described later.

According to the antenna group renew the procedure shown in FIG. 7, the antenna group controller 107 renews the first antenna group and the second antenna group of each user equipment 4, and stores the renew result on the antenna group table 116. With renewing of the antenna group, if there exists the user equipment 4 whose communication scheme needs to be changed between the base station apparatus 1 and the user equipment 4, control information for notifying a new communication scheme to the user equipment 4 will be inputted into the control signal generator 105. The same control information as what is inputted into the control signal generator 105, namely the number of spatial layers and the communication scheme (for example, the space division multiplexing or the diversity communication) which are applied to each user equipment 4 are stored on the antenna group table 116, and are made possible to be referred by the downlink resource allocation 106 and the uplink resource allocation 109. The propagation loss of each antenna and the communication quality of each user equipment 4 are read from the communication quality table 117.

A communication quality measurement 108 has a function in which the base station apparatus 1 measures by itself the communication quality according to a procedure of FIG. 11 and a function of inputting the communication quality information (corresponding to S1304 of FIG. 9) fed back from the user equipment 4 from the control signal decoder 110. It stores the communication quality measurement result by the base station apparatus itself and the communication quality information fed back from the user equipment 4 on the communication quality information table 117. The propagation loss information for each user equipment 4 which is necessary for the base station apparatus 1 by itself to measure the communication quality is supplied from a propagation loss estimation 111; information related to the throughput, namely the allocated frequency resource, the modulation scheme, the coding rate, and an indicator for indicating whether the signal is successfully received are supplied from the data signal decoder 113, respectively.

The uplink resource allocation 109 performs almost the same operation as the downlink resource allocation 106. In accordance with the resource allocation scheme shown in FIG. 10 and FIG. 11, the antenna and frequency resources are allocated to each user equipment 4. When performing resource allocation to the user equipment 4, the first antenna group and the second antenna group of the each user equipment 4 are read from the antenna group table 116, the propagation loss and the communication quality are read from the communication quality table 17, and an uplink instantaneous data rate which the base station apparatus 1 estimates by itself is inputted from the uplink data rate estimation 112. Outputs are, to the data signal decoder 113, the frequency resource, the antennas, the modulation scheme, and the coding rate which were allocated to the user equipment 4 in the past. Here, allocating to the user equipment in the past is said considering a time lag from when the uplink resource allocation 109 generates information of uplink communication resource allocation destined for the user equipment 4 until the signal transmitted from the user equipment 4 is inputted into the data signal decoder 113. Furthermore, to the control signal generator 105, the user equipment 4 outputs the frequency resource, the modulation scheme, and the coding rate in order to generate the control symbol which is for specifying the frequency resource for transmitting the data signal, the modulation scheme, and the coding rate. Moreover, in order to perform the antenna combination shown in FIG. 11, a combination of the antennas to be combined is notified to a baseband signal receiver 114, and the control signal generator 105 is controlled so as to synthesize the data signal and the pilot signal for data decoding which were received with multiple antenna and output it. This control will be described later.

The control signal which was separated by the baseband signal receiver 114 is inputted into the control signal decoder 110. Regarding this embodiment, there are five kinds of control information to be inputted into it. The first of the five kinds is the information of uplink transmission power which corresponds to S1202 of FIG. 8. This is information necessary to perform the propagation loss estimation for the uplink signal, and is outputted to the propagation loss estimation 111. The second is Acknowledgement reply to the notification of transmission/reception scheme (S1206) shown as S1207 in FIG. 8 and FIG. 9. This acknowledgement is notified to the control signal generator 105 which is an issuing origin of the notification of transmission/reception scheme (S1206). The third is the information of downlink reception power shown as S1303 in FIG. 9. Since this is information necessary to estimate the propagation loss for the downlink signal, it is outputted to the propagation loss estimation 111. The fourth is the communication quality information which is described as S1304 in FIG. 9 and is estimated by the user equipment 4. This information is outputted to the communication quality measurement 108. The fifth is downlink data rate information written as S1305 in FIG. 9. Since this information is information of an instantaneous data rate which is used at the time of downlink resource allocation, it is outputted to the downlink resource allocation 106. Incidentally, there may be appropriate control information other than this.

The propagation loss estimation 111 gathers an estimated reception power obtained using the uplink pilot signal (S1201 of FIG. 8) for each user equipment 4 separated by the baseband signal receiver 114, the information of uplink transmission power (S1202 of FIG. 8) and the information of downlink reception power (S1303 of FIG. 9) which are outputted from the control signal decoder 110, and information of downlink transmission power which the base station apparatus 1 recognizes by itself, estimates the propagation loss between the antenna 3 and the user equipment 4 from a comparison between the transmission power and the reception power, and outputs the estimated result to the communication quality measurement 108.

An uplink data rate estimation 112 estimates the uplink instantaneous data rate for each user equipment 4 by referring to the uplink pilot signal (S1201 of FIG. 8) for each user equipment 4 separated by the baseband signal receiver 114. Since the first antenna groups differ for each user equipment 4, the data rate estimation is performed using the uplink pilot signal from the user equipment 4 which is received with the antenna of the first antenna group for the each user equipment 4. The estimated result is outputted to the uplink resource allocation 109.

The data signal decoder 113 performs decoding of an uplink data signal (S1214 of FIG. 8) for each user equipment 4 separated by the baseband signal receiver 114 by referring to the allocation information to the each user equipment 4 inputted from the uplink resource allocation 109. This allocation information includes allocation frequency resource notified to each user equipment 4 through the control signal generator 105 in the past, the modulation scheme, and the coding rate.

The baseband signal receiver 114 has an operation of separating the pilot signal, the data signal, and the control signal for each user equipment 4 from the baseband digital signal for each antenna inputted from the antenna side, and extracting respective symbol sequences through a demodulation operation. This operation includes processings of FFT (Fast Fourier Transform) in the OFDMA-MIMO communication system, propagation path response estimation, and MIMO reception. Combination of the antennas of the second antenna group to the antennas of the first antenna group shown in FIG. 11 is performed in this baseband signal receiver 114. A method of performing this combination will be described later.

An RF signal receiver 115 converts the analog RF signal inputted from the antenna cable 2 into a baseband signal with the down-converter, and converts the baseband signal into a digital signal with the analog-digital converter.

The antenna group table 116 is memory for recording the first antenna group and the second antenna group for each user equipment 4; the communication quality table 117 is memory for recording the communication quality for each user equipment 4, respectively. A record example to the both tables will be described later.

The data buffer 118 is memory for temporarily storing data transmitted to the user equipment 4, and data transmitted from the user equipment 4. The data transmitted to the user equipment 4 is outputted to the data signal generator 104 according to an instruction from the downlink resource allocation 106. The data transmitted from the user equipment 4 is written one by one from the data signal decoder 113, and is transferred to the gateway 7 through the network interface 119.

Figure 15:
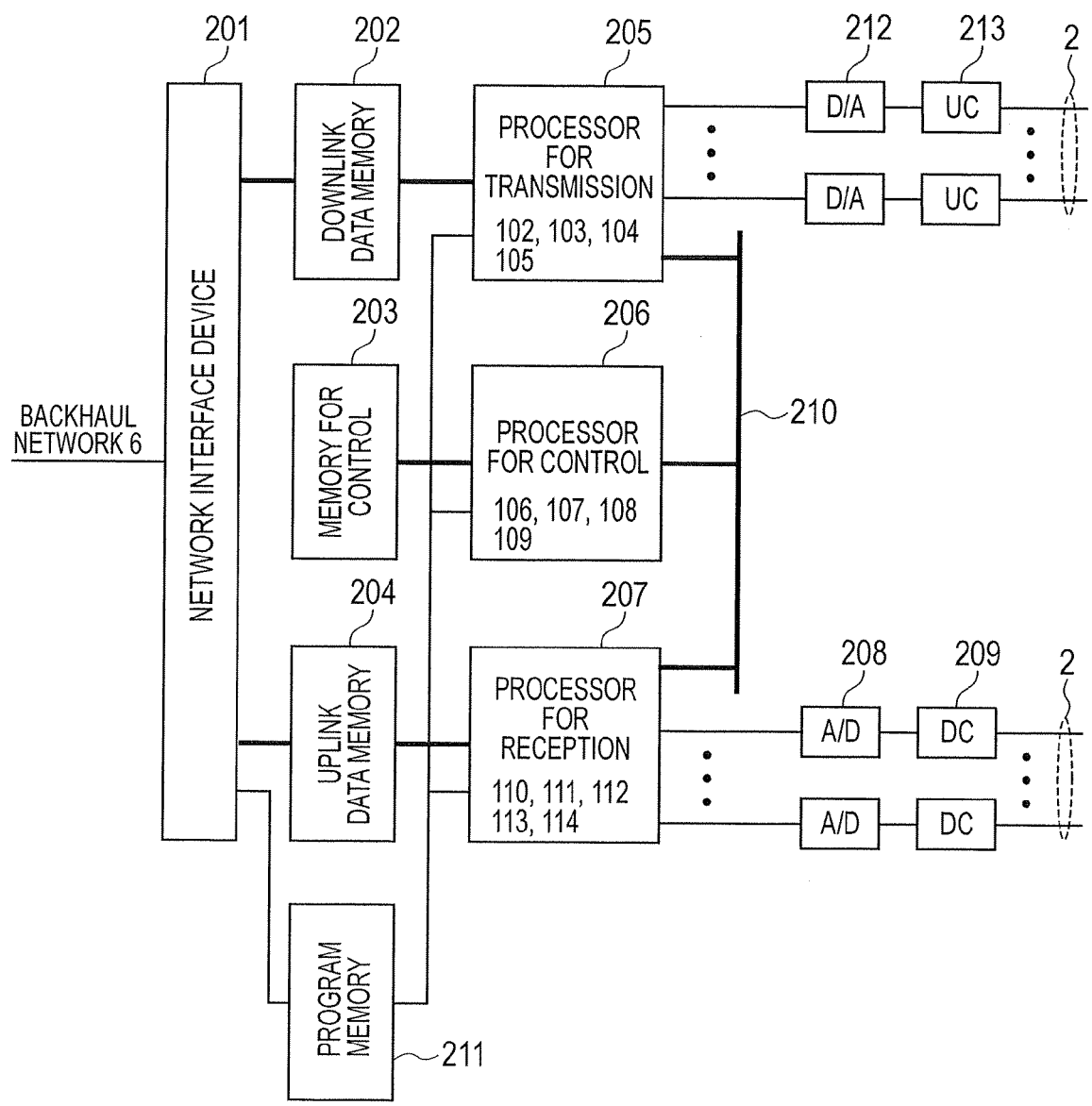
FIG. 15 is a configuration example of a device configuration of the base station apparatus according to this embodiment.

FIG. 15 shows a device configuration of the base station apparatus 1 according to this embodiment. Respective blocks of FIG. 14 are realized by respective devices shown in FIG. 15. A network interface device 201 corresponds to the network interface 119 in functional blocks of FIG. 14, has interfaces with downlink data memory 202, uplink data memory 204, and program memory 211, and connects with the backhaul network 6. For example, it is realized by a network interface card (NIC).

The downlink data memory 202 and the uplink data memory 204 correspond to the data buffer 118 in the functional blocks of FIG. 14, have interfaces with the network interface device 201, and have interfaces with a processor for transmission 205 and a processor for reception 207, respectively. Since writing and reading from the both processors 205, 207 occur simultaneously, two pieces of DPRAM (Dual Port RAM) are used.

Memory 203 for control corresponds to the antenna group table 116 and the communication quality table 117 in the functional blocks of FIG. 14, and has an interface with a processor for control 206. It is realized with memory capable of being randomly accessed, such as DPRAM.

The processor for transmission 205 is a logical circuit or processor including the baseband signal transmitter 102, the antenna dedicated pilot signal generator 103, the data signal generator 104, and the control signal generator 105 in the functional blocks of FIG. 14. Moreover, the processor for transmission 205 has interfaces with the downlink data memory 202, the program memory 211, a data bus 210, and a digital-analog converter 212, and makes possible data transfer between the processor for control 206 and the processor for reception 207 through the data bus 210. Programs of the processor for transmission 205 are stored in the program memory 211. When the base station apparatus 1 starts up, programs of the baseband signal transmitter 102, the antenna dedicated pilot signal generator 103, the data signal generator 104, and the control signal generator 105 are downloaded to the processor for transmission 205 from the program memory 211.

The processor for control 206 is a logical circuit or processor which includes the downlink resource allocation 106, the antenna group controller 107, the communication quality measurement 108, and the uplink resource allocation 109 in the functional blocks of FIG. 14. Moreover, the processor for control 206 has interfaces with the memory 203 for control, the program memory 211, and the data bus 210, and makes possible data transfer between the processor for transmission 205 and the processor for reception 207 through the data bus 210. Programs of the processor for control 206 are stored in the program memory 211, and when the base station apparatus 1 starts, the programs of the downlink resource allocation 106, the antenna group controller 107, the communication quality measurement 108, and the uplink resource allocation 109 are downloaded to the processor for control 206 from the program memory 211.

The processor for reception 207 is a logical circuit or processor which includes the control signal decoder 110, the propagation loss estimation 111, the uplink data rate estimation 112, the data signal decoder 113, and the baseband signal receiver 114 in the functional blocks of FIG. 14. Moreover, the processor for reception 207 has interfaces with the uplink data memory 204, the program memory 211, an analog-digital converter 208, and the data bus 210, which enable data transfer between the processor for transmission 205 and the processor for control 206 through the data bus 210. Programs of the processor for reception 207 are stored in the program memory 211, and when the base station apparatus 1 starts up, the programs of the control signal decoder 110, the propagation loss estimation 111, the uplink data rate estimation 112, the data signal decoder 113, and the baseband signal receiver 114 are downloaded to the processor for reception 207 from the program memory 211.

The program memory 211 has interfaces with the processor for transmission 205, the processor for control 206, and the processor for reception 207, and stores programs to be supplied to these processors. In order to supply these programs at the time of startup of the base station apparatus 1, it is realized by nonvolatile memory, for example, flash memory. Moreover, it also has an interface with the network interface device 201, and realizes program download to the flash memory via the network.

The baseband signal generated by the processor for transmission 205 is converted into an analog signal by the digital-analog converter 212, is further converted into an RF signal by an up-converter 213, and is outputted to the antenna cable 2.

The uplink RF signal inputted from the antenna cable 2 is converted into a baseband signal by a down-converter 209, is further converted into a digital signal by the analog-digital converter 208, and is inputted into the processor for reception 207 as the baseband digital signal.

FIG. 16 is a configuration example of the antenna group table 116 according to this embodiment. The antenna group table 116 lists the number of spatial layers (2002) which is applied to the user equipment 4, the communication scheme (2003) which is distinguished by whether it is the space division multiplexing (SDM) or the diversity communication (DIV), antenna IDs of the antennas within the first antenna group, and antenna IDs (2004) of the antennas within the first antenna group, and antenna IDs (2005) of the antennas within the second antenna group for each user equipment ID (2001). The antenna group controller 107 writes a result being controlled by the procedure shown in FIG. 7 on the antenna group table 116, and the downlink resource allocation 106 and the uplink resource allocation 109 refer to it when performing the resource allocation to the user equipment 4 by procedures shown in FIG. 10 and FIG. 11. For example, suppose that the user equipment 4 to which the first antenna group is allocated in a certain frequency resource are determined to be three pieces of the user equipment of IDs=1, 3, and 4 in a state of the table shown in FIG. 16. At this time, the antennas of antenna IDs=2, 3, 4, 5, 6, 7 and 8 will be allocated to any one of the user equipment 4. Assuming that the range of antenna IDs of the entire system is 0 to 9, IDs of the remaining antennas will be 0, 1, and 9. Although these are allocated from the second antenna group, since these serve as auxiliary antennas to the first antenna group, they will be allocated to any one of the user equipment of IDs=1, 3, and 4 to which the first antenna group was allocated. Regarding the antenna of antenna ID=0 among the antennas of the remaining antenna IDs, since the user equipment 4 such that the second antenna group includes the antenna is not within the user equipment of user equipment IDs=1, 3, and 4, the antenna of antenna ID=0 is not allocated to any terminal and is set to Muting. Since the user equipment of ID=1 and 4 include the antenna of IDs=1 and 9 as of the second antenna group, respectively, the antennas of IDs=1 and 9 are additionally allocated to the user equipment 4 of user equipment IDs=1 and 4, respectively. In order to perform the antenna combination shown in FIG. 11, it is necessary to refer to the communication quality table shown in the embodiment of FIG. 17.

FIG. 17 shows a configuration example of the communication quality table 117 according to this embodiment. The communication quality table 117 lists an index (2007) representing the communication quality for each user equipment ID (2006) and the propagation loss (2008) for each antenna ID. Although in this embodiment, the communication quality was selected to be the throughput, an absolute value [dBm] or SINR [dB] of the reception power may be used for it, as was already described. The smaller the propagation loss, the smaller the attenuation between the base station apparatus 1 and the user equipment 4 becomes, so that such an antenna becomes more likely to be selected as of the first antenna group. The antenna combination shown in FIG. 11 will be explained in a case of the terminal ID=1 in the example of FIG. 16. According to FIG. 16, the user equipment 4 of terminal ID=1 designates antennas of IDs=2, 3, and 4 as of the first antenna group, and according to the configuration example of FIG. 16, the antenna of ID=1 will be allocated additionally. According to the procedure of FIG. 11, the additional antenna is combined with an antenna with the largest propagation loss within the first antenna group. According to FIG. 17, the antenna having the largest propagation loss within the first antenna group of the user equipment 4 of terminal apparatus ID=1 is the antenna of ID=2. Therefore, the antenna of ID=1 will be combined with the antenna of ID=2, and the same data signal and pilot signal for data decoding will be transmitted from these antennas to the user equipment 4 of user equipment ID=1.

Figure 18:
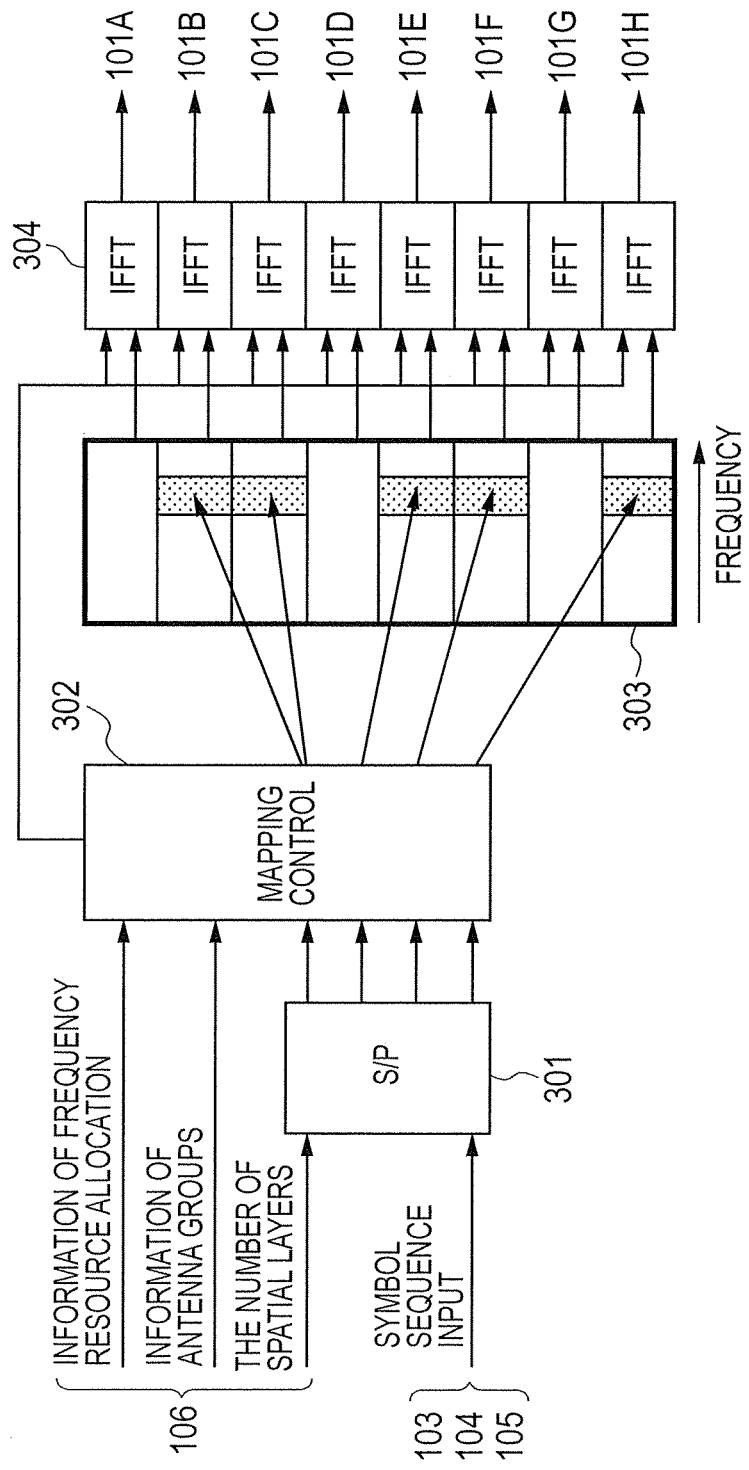
FIG. 18 is a configuration example of a baseband signal transmitter according to this embodiment.

FIG. 18 shows a configuration example of the baseband signal transmitter according to this embodiment. Its inputs are the information of frequency resource allocation related to the user equipment 4 to which the downlink resource allocation 106 allocates resources, the information of antenna groups, the number of spatial layers which are applied to the terminal, and a modulation symbol sequence generated by the antenna dedicated pilot signal generator 103, the data signal generator 104, and the control signal generator 105. Its output is the baseband digital signal for each antenna to the RF signal transmitter 101 for each antenna. In this embodiment, being on the premise that an antenna specific pilot symbol sequence and a control symbol sequence are stored in fixed antenna and frequency resource, how to store a data symbol sequence in the antenna and frequency resources will be explained.

A serial-parallel converter 301 generates the data symbol sequence for each spatial layer from the data symbol sequence destined for a certain user equipment 4 inputted from the data signal generator 104 by referring to the number of spatial layers which is applied to the user equipment 4. The number of spatial layers is inputted from the antenna group table 116 through the downlink resource allocation 106. In an example of FIG. 18, although the data symbol sequence is parallelized into four spatial layers, any number of parallelization can be set up. However, the number of spatial layers cannot exceed an upper limit of the number of layers specified by the radio interface standard which is applied in the radio communication system.

In accordance with the antenna and frequency resources allocated to the user equipment 4 decided by a procedure of FIG. 10 and the combination result between the allocated antennas decided by the procedure of FIG. 11, a mapping memory controller 302 performs a control of storing the data symbol sequence inputted from the serial-parallel converter 301 in mapping memory 303. The example of FIG. 18 shows an example where the data symbol sequence of four spatial layers which will be transmitted to a certain user equipment 4 is inputted into the mapping controller 302 from the serial-parallel converter 301, and the antenna combination is performed to the first layer among the four spatial layers. In which antenna resource and in which frequency resource the modulation symbol of the each spatial layer inputted from the serial-parallel converter 301 should be stored are decided by complying with a value instructed from the downlink resource allocation 106. Incidentally, if precoding is applied to multiple spatial layer signals, a precoder will be inserted between the serial-parallel converter 301 and the mapping controller 302, or the mapping controller 302 is given a function of precoding.

The mapping memory 303 is memory for storing the modulation symbol to be transmitted for each frequency direction, that is, for each so-called subcarrier for each antenna in a unit time, for example, for each OFDM symbol. When all the modulation symbols related to the unit time have been stored, a mapping control section 302 gives an enable to each IFFT part 304. Then, the IFFT part 304 of each antenna reads the memory content related to its own antenna, performs an IFFT processing, and outputs the baseband digital signal in a time domain to the RF signal transmitter 101.

The IFFT part 304 has a function of, being triggered by the enable from the mapping controller 302, performing the IFFT processing by referring to the content of the mapping memory 303, and outputting the baseband signal to the RF signal transmitter 101. A function of inserting GI (Guard Interval) may be within the IFFT part 304.

Figure 19:
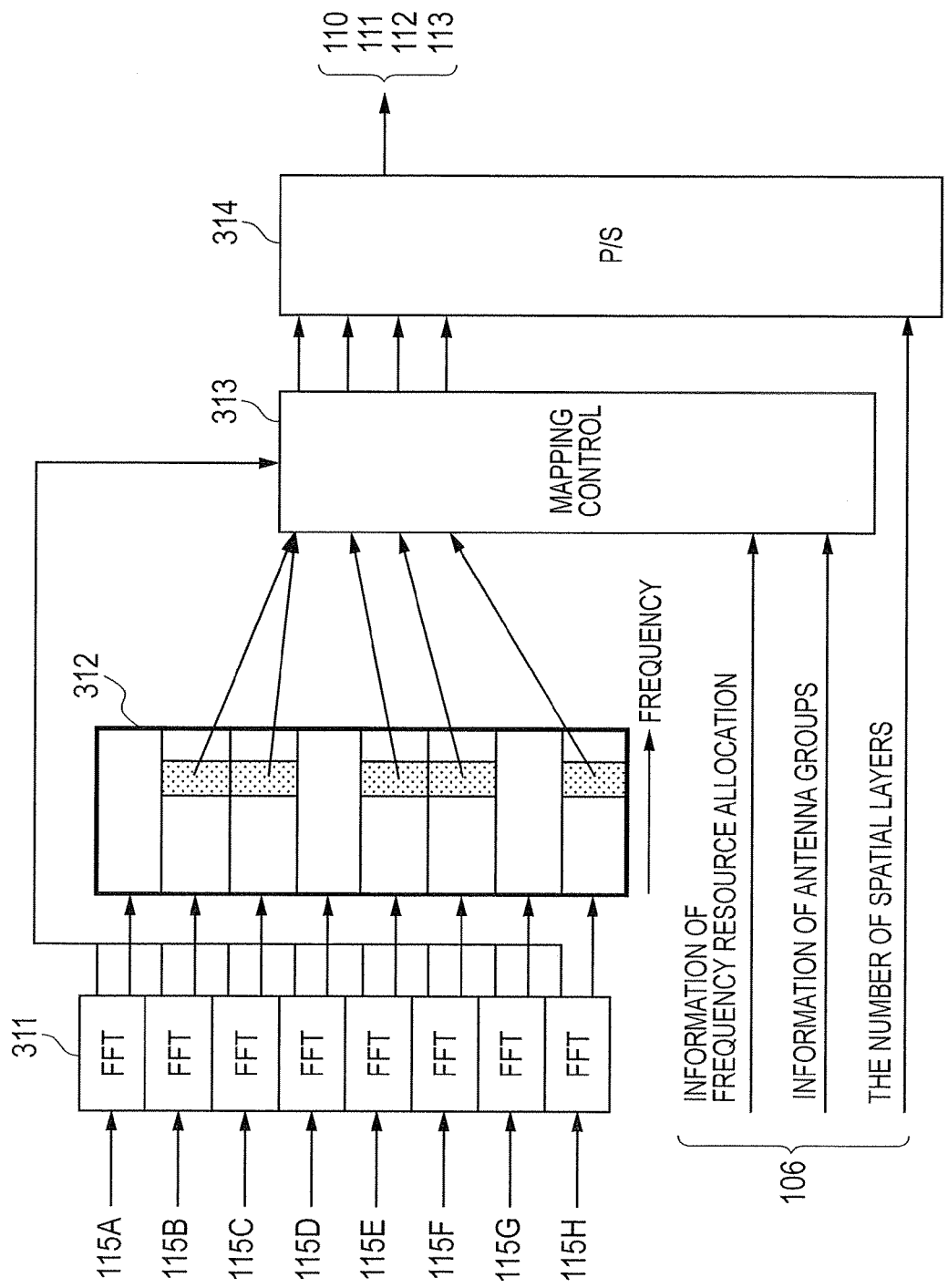
FIG. 19 is a configuration example of a baseband signal receiver according to this embodiment.

FIG. 19 shows a configuration example of the baseband signal receiver according to this embodiment. Its inputs are the baseband digital signal for each antenna which is inputted from the RF signal receiver 115 of each antenna, the information of frequency resource allocation related to the user equipment 4 to which the uplink resources are allocated by the uplink resource allocation 109, information of antenna groups, and the number of spatial layers which are applied to the terminal.

Outputs are the control symbol sequence outputted into the control signal decoder 110, the pilot symbol sequence outputted to the propagation loss estimation 111 and the uplink data rate estimation 112, and the data symbol sequence outputted to the data signal decoder 113. This embodiment is on the premise that the pilot signal and the control signal transmitted from the user equipment 4 are stored in fixed antenna and frequency resources, and a method of extracting the data symbol sequence from the antenna and frequency resources based on the allocation information will be explained.

An FFT part 311 has functions of performing an FFT processing on the baseband digital signal inputted from the RF signal receiver 115 and of storing a result of conversion into a frequency domain signal in demapping memory for each antenna. If the storing of a certain unit time, for example, of an entire OFDM symbol is finished, an enable for enabling reading will be issued to a demapping controller 313.

The demapping memory 312 is memory for storing the modulation symbols received for respective frequency directions, i.e., for each of the so-called subcarriers for each antenna in a unit time, for example, for each OFDM symbol. When all the modulation symbols related to the unit time are stored, each FET part 311 issues an enable signal to the demapping controller 313, and the content of the memory is read from the demapping controller 313.

According to the antenna and frequency resources which are allocated to the user equipment 4 and are decided by the procedure of FIG. 10 and a combination result between the allocated antennas decided by the procedure of FIG. 11, the demapping controller 313 forms again the data symbol sequence for each spatial layer related to the user equipment 4 from the demapping memory 312. On which antenna and in which frequency resource the data symbol of the user equipment 4 is located is specified by a value instructed from the uplink resource allocation 109. When the antenna combination by FIG. 11 has occurred, the antenna combination is represented by arrows going from the demapping memory 312 related to the second and third antennas to the demapping controller 313 being combined in an example of FIG. 19. These signals are added simply. That is, a simple addition of signals inputted from the two antennas is outputted to a parallel-serial converter 314 as a received signal from the first spatial layer. Incidentally, in the case where a space signal processing such as Zero Forcing is performed on the received symbol sequence of multiple spatial layers after the antenna combination processing, a space signal processor is inserted between the demapping controller 313 and the parallel-serial converter 314.

The parallel-serial converter 314 performs a processing of combination the data symbol sequence of multiple spatial layers of certain user equipment 4 inputted from the demapping controller 313. The number of spatial layers inputted from the demapping controller 313 is instructed from the uplink resource allocation 109.

Figure 20:
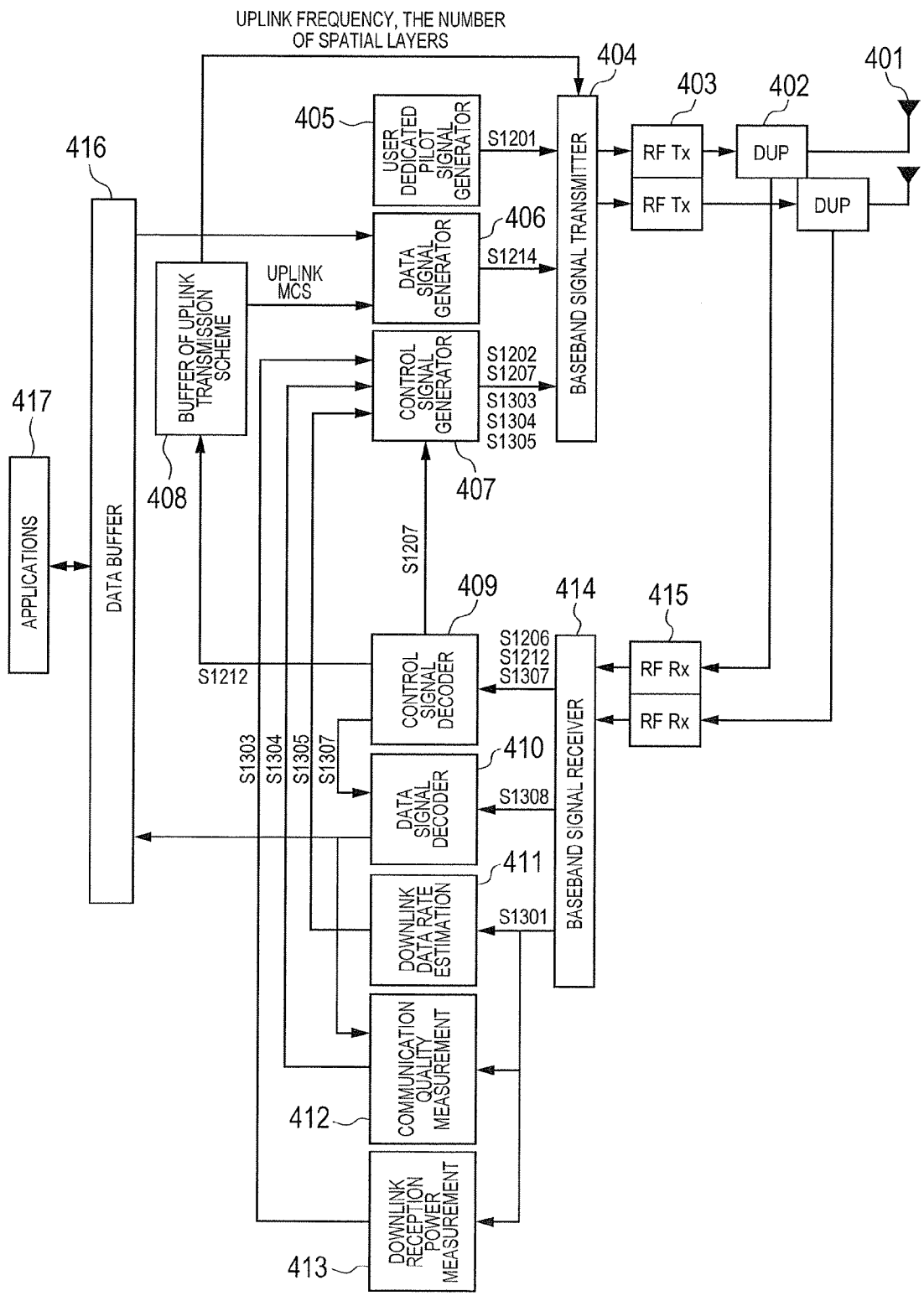
FIG. 20 is a configuration example of the user equipment according to this embodiment.

FIG. 20 shows a configuration example of the user equipment 4 according to this embodiment. Although the example of illustration is an example of a case where the user equipment 4 has two antennas 401, restriction is not intended to be imposed on the number of antennas which the user equipment 4 has.

A duplexer 402 has a function as a demultiplexer for flowing the downlink RF signal transmitted from the base station apparatus 1 to the user equipment 4 to the RF signal receiver 415, and for flowing the uplink signal transmitted from the user equipment 4 to the base station apparatus 1 to the antenna 401.

An RF signal transmitter 403 has a function of converting the inputted baseband digital signal into an analog signal with the digital-analog converter, converting it into a radio frequency signal (RF signal) with the up-converter, and outputting the RF analog signal. An output destination is the antenna 401.

A baseband signal transmitter 404 generates baseband digital signals each of which is to be outputted from each antenna by arranging the pilot signal which is specific to the user equipment and is generated by the user dedicated pilot signal generator 405, the data symbol and the pilot symbol for decoding used for data symbol decoding which the data signal generator generates, and the control symbol which the control signal generator 407 generates on resource elements comprised of axes of time, frequency, and antenna. This generation includes processings of layer mapping in the OFDMA-MIMO communication system, precoding, and IFFT (Inverse Fast Fourier Transform).

The user dedicated pilot signal generator 405 has a function of generating a pilot symbol specific to the user equipment and outputting it to the baseband signal transmitter 404. The uplink pilot signal transmitted in S1201 of the sequence diagram of FIG. 8 is generated here.

A data signal generator 406 reads the data sequence destined for the base station apparatus 1 from a data buffer 416 using the modulation scheme and the coding rate stored in an uplink transmission scheme buffer 408, and performs coding and modulation. Since a frequency resource allocation result decides the number of symbols to be transmitted to the user equipment 4, rate matching is performed so that as much modulation symbols as this number of symbols may be outputted. Moreover, the pilot symbol for data symbol decoding is also generated. The data symbol and the pilot symbol for data symbol decoding which are generated in the data signal generator 406 correspond to the uplink data signal (S1214) of the sequence diagram of FIG. 8.

The control signal generator 407 generates the information of transmission power (S1202 of FIG. 8) of the user equipment 4 to be transmitted to the base station apparatus 1, the Acknowledgement reply (S1207) to the notification of transmission/reception scheme (S1206) transmitted from the base station apparatus 1, the information of downlink reception power which transmits a result estimated by the downlink reception power measurement 413 in a format shown in FIG. 13B, the information of communication quality (S1304 of FIG. 9) which transmits the downlink communication quality estimated by the communication quality measurement 412 in a format shown in FIG. 13D, and the downlink data rate (S1305 of FIG. 9) estimated by the downlink data rate estimation 411 as a control symbol sequence.

The uplink transmission scheme buffer 408 is a buffer which acquires the information of allocated uplink resource (S1212 of FIG. 8) notified from the base station apparatus 1 to the user equipment 4 from the control signal decoder 409, and keeps it stored until it becomes the transmission timing of the uplink signal. The transmission timing of the uplink signal is decided uniquely by a protocol in such a way, for example, that it shall be a fixed time later after the user equipment 4 acquired the information of allocated uplink resource. Pieces of information stored in the uplink transmission scheme buffer 408 are information of frequency resource allocated from the base station apparatus 1 for uplink communication, the modulation scheme and the coding rate to be applied, and identification information indicating the number of spatial layers and the communication scheme notified by the notification of transmission/reception scheme (S1206)

The control signals which were separated by a baseband signal receiver 414 are inputted into the control signal decoder 409. Specifically, the control signals are the notification of transmission/reception scheme (S1206) of FIG. 13A notified from the base station apparatus 1, the information of allocated uplink resource (S1212), and the information of allocated downlink resource (S1307). Contents of the notification of transmission/reception scheme (S1206) and the information of allocated uplink resource (S1212) are stored in the uplink transmission scheme buffer 408. Regarding the notification of transmission/reception scheme (S1212), in order to notify that this notification was successfully received free from error to the base station apparatus 1 side, an Acknowledgement reply (S1207) is transmitted as the uplink control signal through the control signal generator 407. The information of allocated downlink resource (S1307) includes the information of frequency resource allocation required to decode the data signal (S1308) simultaneously transmitted in the downlink direction, the modulation scheme, and the coding rate, and is outputted to a data signal decoder 410.

The data signal decoder 410 performs decoding of the downlink data signal (S1308 of FIG. 9) separated in the baseband signal receiver 414 by referring to the allocation information from the control signal decoder 409.

The downlink transmission rate estimation 411 estimates the downlink instantaneous data rate of the user equipment 4 by referring to the downlink pilot signal (S1301 of FIG. 9) separated in the baseband signal receiver 414. The estimated result is inputted into the control signal generator 407, and is transmitted to the base station apparatus 1 as the uplink control signal.

The communication quality measurement 412 performs estimation of the reception power or the SINR using the downlink pilot signal (S1301 of FIG. 9), or throughput measurement by referring to an indicator for indicating whether the decoding result in the data signal decoder 410 succeeded. Estimation procedures of these are as shown in FIG. 12. The estimated result is transmitted to the base station apparatus 1 through the control signal decoder 409 as the control signal in the format shown in FIG. 13D (S1304 of FIG. 9).

The downlink reception power measurement 413 performs estimation of the downlink reception power for each antenna 3 using the pilot signal (S1301 of FIG. 9) transmitted from the base station apparatus 1. The estimated result is transmitted to the base station apparatus 1 through the control signal decoder 409 as the control signal in the format shown in FIG. 13B (S1303 of FIG. 9).

The baseband signal receiver 414 includes an operation of separating the pilot signal, the data signal, and the control signal from the baseband digital signal for each antenna inputted from the antenna side, and extracting symbol sequences of the respective signals through a decoding operation. That operation includes processings of FFT (Fast Fourier Transform) in the OFDMA-MIMO communication system, the propagation path response estimation, and the MIMO reception.

The RF signal receiver 415 converts the analog RF signal inputted from the antenna 401 into a baseband signal with the down-converter, and converts it into a digital signal with the analog-digital converter.

The data buffer 416 has a function of buffering data to be transmitted as the uplink data signal from an application 417 and a function of buffering the downlink data signal which is outputted by the data signal decoder 410 and is transmitted from the base station apparatus 1 until the application 417 takes it in.

2. Second Embodiment

In this embodiment, an operation of exerting a renew request trigger of the first antenna group from the user equipment 4 on the radio communication system shown in the first embodiment as a base.

Figure 21:
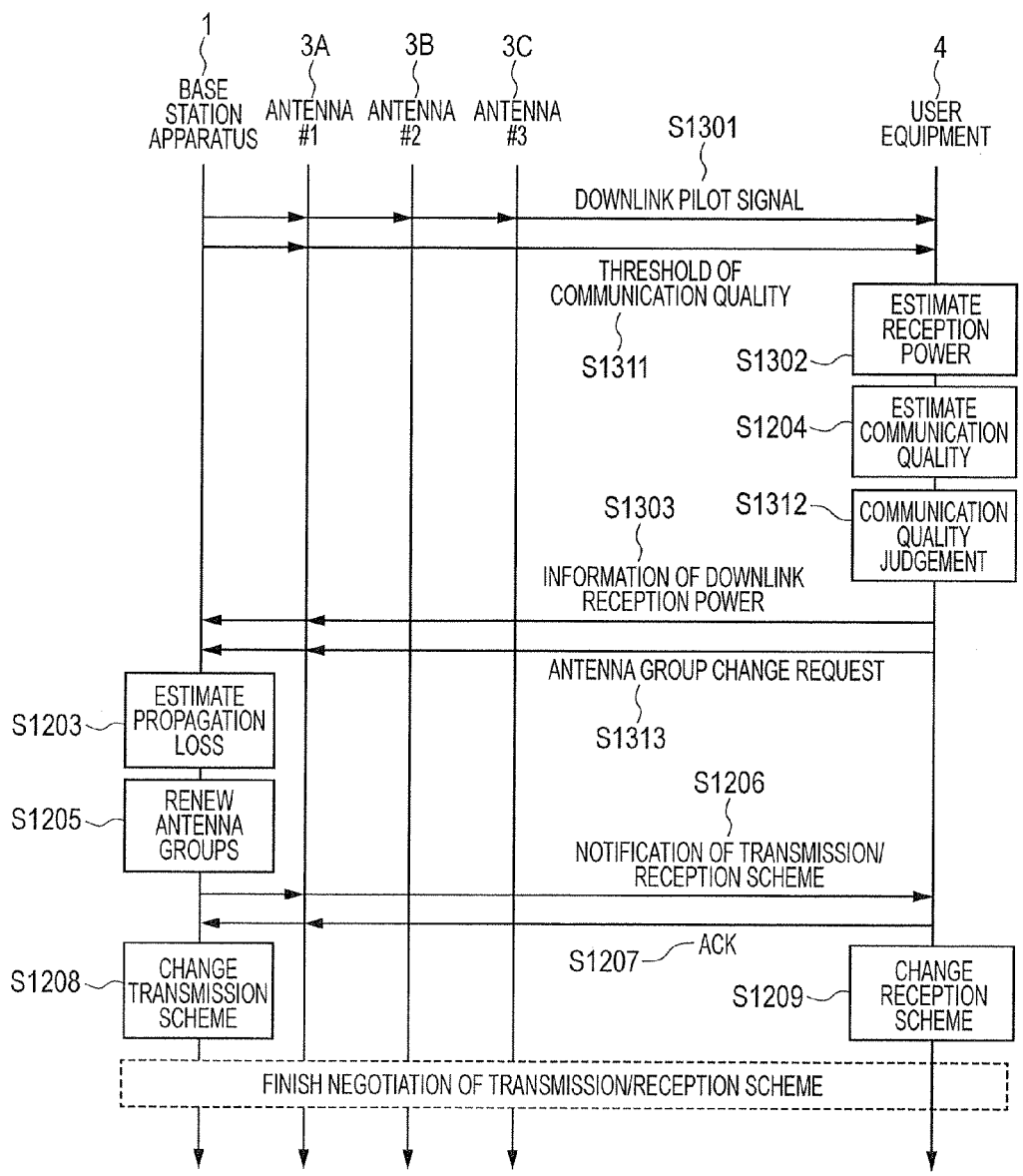
FIG. 21 is an example of an operating sequence between the base station apparatus and the user equipment according to a second embodiment.

FIG. 21 shows one example of an operating sequence in the second embodiment. FIG. 21 shows almost the same content as in FIG. 9 in the first embodiment, and explanations of portions whose contents overlap are omitted.

In S1311, the base station apparatus 1 transmits a message which includes the lower limit of the required value and the upper limit of the required value of the communication quality having been used by the base station apparatus 1 in the first embodiment to the user equipment 4. In S1312, the user equipment 4 performs a threshold determination on the communication quality estimated in S1204, for example, in a manner of FIG. 5. If the estimated communication quality is lower than the lower limit of the required value, it will request an increase in the number of antennas to the base station apparatus 1. On the other hand, If it exceeds the upper limit of the required value, the user equipment 4 will issue an indicator which admits a decrease in the number of antennas, that is, an indicator such that a request of increase in the number of antennas is set to unity and a permission of decrease in the number of antennas is set to zero, and will transmit the indicator to the terminal station apparatus 1 in S1313.

Since the indicator is transmitted as the downlink control signal, in S1311, the control signal generator 105 in the base station apparatus 1 of FIG. 14 generates a signal to be transmitted to the user equipment 4 using the lower limit of the required value and the upper limit of the required value of the communication quality being set in the base station apparatus 1 as control information. This control signal is decoded by the control signal decoder 409 in the user equipment 4 of FIG. 20, and is notified to the control signal generator 407. The control signal generator 407 performs comparison of this value and the result which the communication quality measurement 412 estimated, generates the indicator as control information according to a threshold determination result, and transmits it as the uplink control signal of S1313.

According to this embodiment, the processing can be performed based on a downlink quality measured by the terminal, and therefore it is expected that accuracy is further improved compared with the first embodiment where uplink and downlink propagation losses are assumed equal.

3. Configuration Example

This radio communication method, in the radio communication system in which there exist the base station apparatus having multiple antennas and the user equipment for performing radio communication with the first antenna group comprised of one or more of the antennas, is in one aspect characterized in that the first antenna group is made configurable for each of the user equipment individually, and the addition or deletion of the antenna to/from the first antenna group of the terminal is performed based on the communication quality of each user equipment so that the number of antennas within the first antenna group may be minimized within a range which satisfies a required value of the communication quality between the base station apparatus and the user equipment.

The above-mentioned radio communication method is in one aspect characterized in that an antenna group comprised of all of or a part of the antennas among the all the antennas which the base station apparatus has but which excludes the antennas within the first antenna group is designated as the second antenna group, the antennas within the first antenna group are specified as the antennas which are sure to be used when the base station apparatus communicates with the user equipment, and all of or a part of the antennas within the second antenna group are specified as the antennas which may be used when the base station apparatus communicates the user equipment.

The above-mentioned radio communication method is in one aspect characterized in that the operation of the addition or the deletion of the antenna to/from the first antenna group is performed by dividing it into multiple operations and by setting an interval between these operations.

The above-mentioned radio communication method is in one aspect characterized in that two kinds of the communication quality required values, the lower limit of the required value of the communication quality and the upper limit of the required value of the communication quality which is a larger value than the lower limit of the required value of the communication quality, are defined, an operation of the addition of the antenna is performed on condition that the communication quality gets lower than the lower limit of the required value of the communication quality, and an operation of the deletion of the antenna is performed on condition that the communication quality exceeds the upper limit of the required value of the communication quality.

Moreover, the above-mentioned radio communication method is in one aspect characterized in that the lower limit of the required value of the communication quality and the upper limit of the required value of the communication quality are transmitted to the user equipment from the base station apparatus, measurement and the threshold determination of the communication quality are performed by the user equipment, determination of the addition of the antenna or the deletion of the antenna is performed by the user equipment, the determination result is transmitted to the base station apparatus from the user terminal, and the base station apparatus performs an operation of the addition of the antenna or an operation of the deletion of the antenna based on the determination result.

The radio communication method is in one aspect characterized by including a first step of measuring the communication quality for the each user equipment, a second step of renewing the first antenna group of the each user equipment based on the result of the first step, and a third step of performing allocation of radio communication resources including the antennas for performing the radio communication with the user equipment in each time slot.

Moreover, the radio communication method is in one aspect characterized in that at a time when the second step is finished, if there occurs a change in the number of spatial layers allocatable to the user equipment before/after performing the second step, a negotiation of the transmission/reception scheme will be performed between the base station apparatus and the user equipment.

Moreover, the radio communication method is in one aspect characterized in that at a time when the negotiation is performed, a message to be exchanged between the base station apparatus and the user equipment includes the number of the spatial layers and an indicator for indicating which transmission it is, the space division multiplexing communication or the diversity communication, as a transmission scheme utilizing the spatial layers.

The above-mentioned radio communication method is in one aspect characterized in that the third step includes a fourth step of allocating all of the antennas within the first antenna group based on an estimated result of the instantaneous data rate of the each user equipment, and a fifth step of subserviently allocating the antenna which is not allocated to any of the user equipment in the fourth step to any one of the user equipment to which the antenna is allocated in the fourth step.

Moreover, the radio communication method is in one aspect characterized in that the antenna allocated subserviently in the fifth step is made to be combined to any of the antennas allocated in the fourth step, both of the antennas transmit the same data signal to the user equipment to which both of the antennas are allocated, and what are received by the both of the antennas are added to the data signal transmitted from the user equipment.

This radio communication system is a radio communication system in which there exist the base station apparatus having multiple antennas and the user equipment for performing radio communication with the first antenna group including one or more of the antennas, the radio communication system being in one aspect characterized in that the base station apparatus makes up the first antenna group of the individual user equipment based on the communication quality between the base station apparatus and the user equipment, and informs the number of spatial layers which can be provided to each of the user equipment based on the first antenna group of each of the user equipment which are made up by the base station apparatus.

The above-mentioned radio communication system is in one aspect characterized in that the user equipment estimates the communication quality, the user equipment transmits the estimated result to the base station apparatus therefrom, and the base station apparatus transmits the pilot signal, the control signal, and the data signal which are necessary for the user equipment to estimate the communication quality to the user equipment.

The above-mentioned radio communication system is in one aspect characterized in that the base station apparatus estimates the communication quality, and the user equipment transmits the pilot signal, the control signal, and the data signal which are necessary for the base station apparatus to estimate the communication quality to the base station apparatus.

This base station apparatus is a base station apparatus that has multiple antennas, outputs the downlink communication signal destined for the user terminal for each of the antennas, receives an input of the uplink communication signal transmitted from the user terminal for each of the antennas, and has a baseband signal processor and a radio communication resource allocation of the downlink communication and the uplink communication to/from the user terminal, and that is in one aspect characterized by having: a communication quality measurement for renewing the communication quality for the each user equipment successively, and an antenna group controller for adding or deleting the antenna within the first antenna group which are sure to be used when the user equipment performs communication depending on whether the communication quality for the each user equipment acquired by the communication quality measurement satisfies the required value of the communication quality or not.

In the above-mentioned base station apparatus, the antenna group controller is in one aspect characterized in that the addition or deletion of the antenna within the second antenna group which includes the antennas being subserviently usable by the user equipment and not within the first antenna group is also performed in addition to the first antenna group which are sure to be used when the user equipment performs communication.

Moreover, the radio communication resource allocation is in one aspect characterized by performing allocation of radio communication resources including allocation of the antennas being set up for the user equipment in each time slot based on the first antenna group and the second antenna group for the each user equipment which the antenna group decides.

Furthermore, the radio resource allocation is in one aspect characterized in that when the radio communication resource allocation subserviently allocates the antenna within the second antenna group in addition to the antennas within the first antenna group being set up for the user equipment, the radio resource allocation controls the baseband signal processor so that the same data signals may be transmitted from both of the antennas to the user equipment or the data signals being received by both of the antennas after being transmitted from the user equipment may be synthesized.

In the above-mentioned base station apparatus, the baseband signal processor is in one aspect characterized by having a control signal generator of, when the number of spatial layers which are securable between the base station apparatus and the user equipment is changed with renewing of the first antenna group which the antenna group controller decided to be set up for the user equipment, generating the control signal for notifying the user equipment of the number of spatial layers after the change.

The present invention is available, for example, for the radio communication using multiple antennas.

What is claimed is:

1. A radio communication system capable of communicating with a plurality of user devices, comprising:
a base station apparatus connected to a plurality of antennas and a controller which selects one or more antennas of the plurality of antennas to be in an antenna group based on a quality of communication performed between the base station apparatus and one or more user devices of the plurality of user devices and based on a number of antennas within the antenna group, wherein one antenna group comprised of selected antennas is configured for each of the user devices of the plurality of user devices for communication,
a first antenna group comprised of selected antennas is configured for a first user device of the plurality of user devices for communication,
the controller adds or removes a first antenna to/from the first antenna group based on whether the communication quality between the base station and the first user device through the selected antennas within the first antenna group is within a range defined by a lower limit of a required value and an upper limit of the required value of the communication quality, and
the base station apparatus communicates with the first user device using at least the selected antennas of the first antenna group.

2. The radio communication system according to claim 1, wherein one or more of the plurality of antennas among the antennas to which the base station apparatus is connected, excluding the selected antennas within the first antenna group, are configured as a second antenna group, and
wherein the one or more antennas within the second antenna group are used together with the selected antennas of the first antenna group when the base station apparatus communicates with any one of the plurality of user devices.

3. The radio communication system according to claim 1, wherein a processing of the addition or the removal of the first antenna to/from the first antenna group is performed by dividing the processing into multiple operations and by setting an interval between these operations.

4. The radio communication system according to claim 1, wherein the lower limit of the required value of the communication quality and the upper limit of the required value of the communication quality, which is larger than the lower limit of the required value of the communication quality, are decided in advance as required communication qualities,
wherein the base station apparatus performs a processing of adding the first antenna to the first antenna group on a condition that the communication quality is lower than the lower limit of the required value of the communication quality, and
wherein the base station apparatus performs a processing of the removal of the first antenna from the first antenna group on a condition that the communication quality exceeds the upper limit of the required value of the communication quality.

5. The radio communication system according to claim 4, wherein the base station apparatus transmits the lower limit of the required value of the communication quality and the upper limit of the required value of the communication quality to the first user device,
wherein the first user device measures the communication quality with the base station apparatus, compares the measured communication quality with the lower limit of the required value of the communication quality and the upper limit of the required value of the communication quality, and performs determination of the addition or removal of the first antenna, and
wherein the base station apparatus performs the processing of adding the first antenna or the processing of removing the first antenna based on the determination result.

6. The radio communication system according to claim 1, wherein the base station apparatus:
measures the communication quality with each user device,
renews the first antenna group for each of the user devices based on the measured communication quality, and
allocates radio communication resources for performing radio communication with the user devices including the antennas in each time slot based on the renewed first antenna group.

7. The radio communication system according to claim 1, wherein a number of spatial layers is decided in advance by negotiation of the base station apparatus and the first user device, and
wherein, when the number of spatial layers that can be provided to the first user device is changed by renewing the first antenna group, the negotiation of a transmission/reception scheme is performed again between the base station apparatus and the first user device.

8. The radio communication system according to claim 7, wherein a message, which is exchanged between the base station apparatus and the first user device when performing the negotiation again, includes the number of spatial layers and an indicator for indicating a transmission scheme utilizing the spatial layers, the transmission scheme selected from space division multiplexing transmission or diversity transmission.

9. The radio communication system according to claim 2,
wherein the antennas within the first antenna group configured for the first user device are allocated to the first user device, and wherein an antenna of the second antenna group which is allocated to none of the user devices, is allocated to any one of the user devices to which the antennas of the first antenna group are allocated so that the number of spatial layers decided in advance between the base station apparatus and the terminal cannot be changed.

10. The radio communication system according to claim 9,
wherein the user device to which the antennas of the first antenna group are allocated in a predetermined frequency resource of a predetermined time slot based on an estimated result of an instantaneous data rate for each of the user devices is selected sequentially, and if all the antennas within the first antenna group of the user device are not allocated to any other user equipment in the frequency resource of the time slot, the antennas will be allocated to the user device which is selected.

11. The radio communication system according to claim 9,
wherein the same data signal as the data signal from any one of the antennas allocated from the first antenna group is transmitted from the antenna allocated from the second antenna group to the first user device, and wherein a data signal that was transmitted from the user equipment and is received by one of the antennas allocated from the first antenna group or from the second antenna group, and a data signal that was transmitted from the user device and is received by the other one of the antennas allocated from the first antenna croup or from the second antenna group are added together.

12. The radio communication system according to claim 9,
wherein an antenna is added on a priority basis from the second antenna group to the first user device if communication quality between the base station apparatus and the first user device is close to or lower than the lower limit of the required value of the communication.

13. The radio communication system according to claim 1,
wherein the base station apparatus receives a pilot signal, a control signal, and a data signal from the first user device, and estimates the communication quality, or the first user device receives the pilot signal, the control signal, and the data signal from the base station apparatus, estimates the communication quality, and transmits the estimated result to the base station apparatus.

14. A radio communication method using a base station apparatus connected to a plurality of antennas and performing radio communication with a plurality of user devices through an antenna group comprised of one or more antennas of the plurality of antennas, the method comprising the steps of:

configuring one antenna group comprised of one or more antennas of the plurality of antennas for each of the user devices of the plurality of user devices for communication;

configuring a first antenna group comprised of one or more antennas of the plurality of antennas for a first user device of the plurality of user devices for communication;

adding or removing antenna of the plurality of antennas to/from the first antenna group based on whether a communication quality between the base station apparatus and the first user device through the one or more antennas of the first antenna group is within a range defined by lower limit of a required value and an upper limit of the required value of the communication quality; and communicating, between the base station apparatus and the user device using at least the one or more antennas of the first antenna group.

* * * * *